United States Patent [19]
Kim

[11] Patent Number: 5,596,453
[45] Date of Patent: Jan. 21, 1997

[54] WIDE-ANGLE ZOOM LENS

[75] Inventor: Moon-hyeon Kim, Changwon, Rep. of Korea

[73] Assignee: Samsung Aerospace Industries, Ltd., Kyeongsangnam-do, Rep. of Korea

[21] Appl. No.: 338,754

[22] Filed: Nov. 10, 1994

[30] Foreign Application Priority Data

Nov. 11, 1993 [KR] Rep. of Korea .................... 93-23913

[51] Int. Cl.$^6$ ................................................ G02B 15/14
[52] U.S. Cl. ........................................................... 359/692
[58] Field of Search ................................. 359/692, 690, 359/687, 688

[56] References Cited

U.S. PATENT DOCUMENTS

| | | |
|---|---|---|
| 4,787,718 | 11/1988 | Cho . |
| 4,824,236 | 4/1989 | Ueda ....................... 359/690 |
| 4,998,808 | 3/1991 | Shibayama . |
| 5,082,360 | 1/1992 | Sato et al. ................. 359/692 |
| 5,144,489 | 9/1992 | Shibayama . |
| 5,247,393 | 9/1993 | Sugawara ................. 359/690 |
| 5,398,135 | 3/1995 | Ohashi ..................... 359/692 |

FOREIGN PATENT DOCUMENTS 4-58207  2/1992  Japan .

*Primary Examiner*—Georgia Y. Eyps
*Assistant Examiner*—Jacqueline M. Steady
*Attorney, Agent, or Firm*—Finnegan, Henderson, Farabow, Garrett & Dunner, L.L.P.

[57] ABSTRACT

A wide-angle zoom lens system includes a first lens group having a positive refractive power and a second lens group having a negative refractive power and spaced from the first lens group at a first distance, the first distance being variable during zooming. The first lens group includes a first lens having a positive refractive power and a convex surface toward an object, a second lens having a negative refractive power and concave surfaces, a third lens having a positive refractive power and convex surfaces, a fourth lens having a negative refractive power and convex surfaces, a fifth lens having a negative refractive power and a concave surface toward the object, and a sixth lens having a positive refractive power and one of convex and meniscus surfaces. The second lens group includes a seventh lens having a positive refractive power and a concave surface toward the object and at least one element of a negative refractive power lens. The zoom lens system having the following characteristics:

$0.5 < f_1/f_w < 0.82$ $0.42 < |f_2/f_w| < 0.82, \ f_2 < 0$ $1.3 < m_{2w} < 1.9$ where
- $f_1$ is a focal length of the first lens group,
- $f_2$ is a focal length of the second lens group,
- $f_w$ is a focal length of the zoom lens system at a wide angle position, and
- $m_{2w}$ is an image formation magnification at a wide angle position.

14 Claims, 21 Drawing Sheets

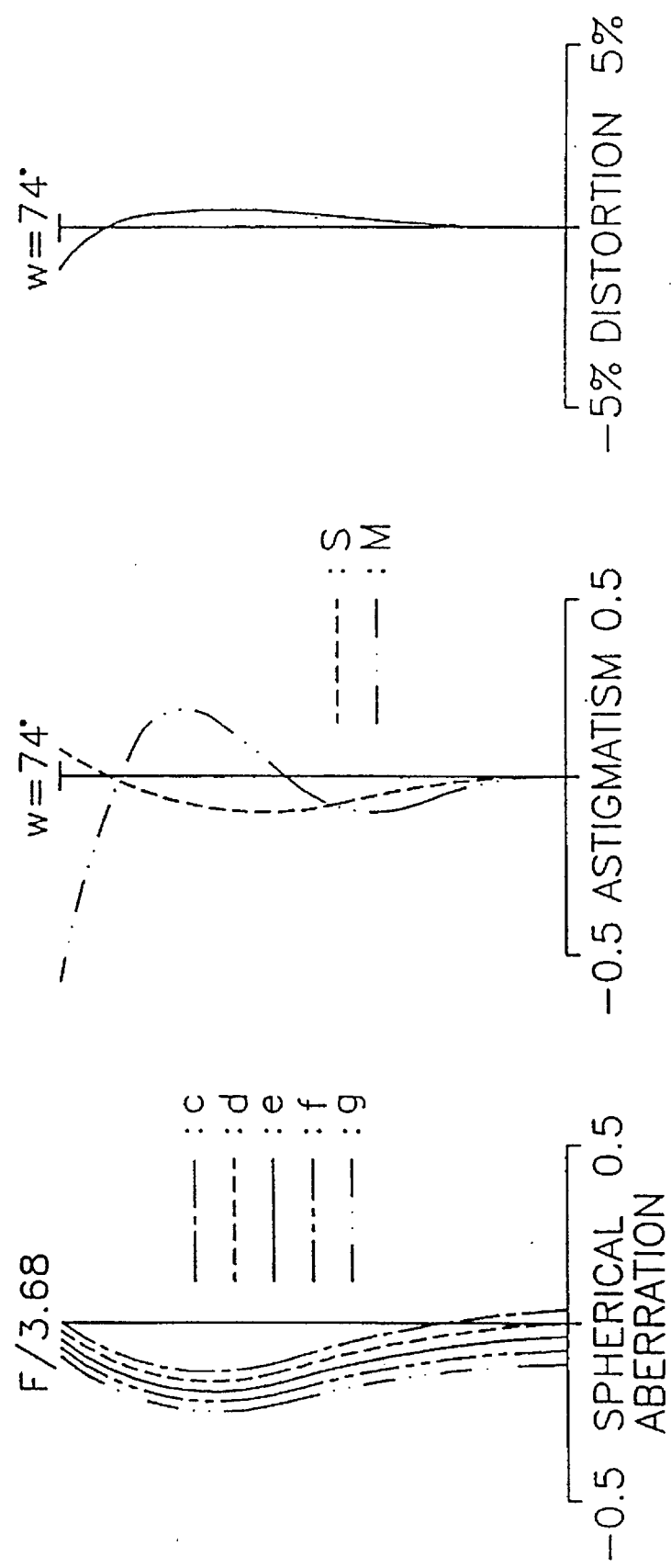

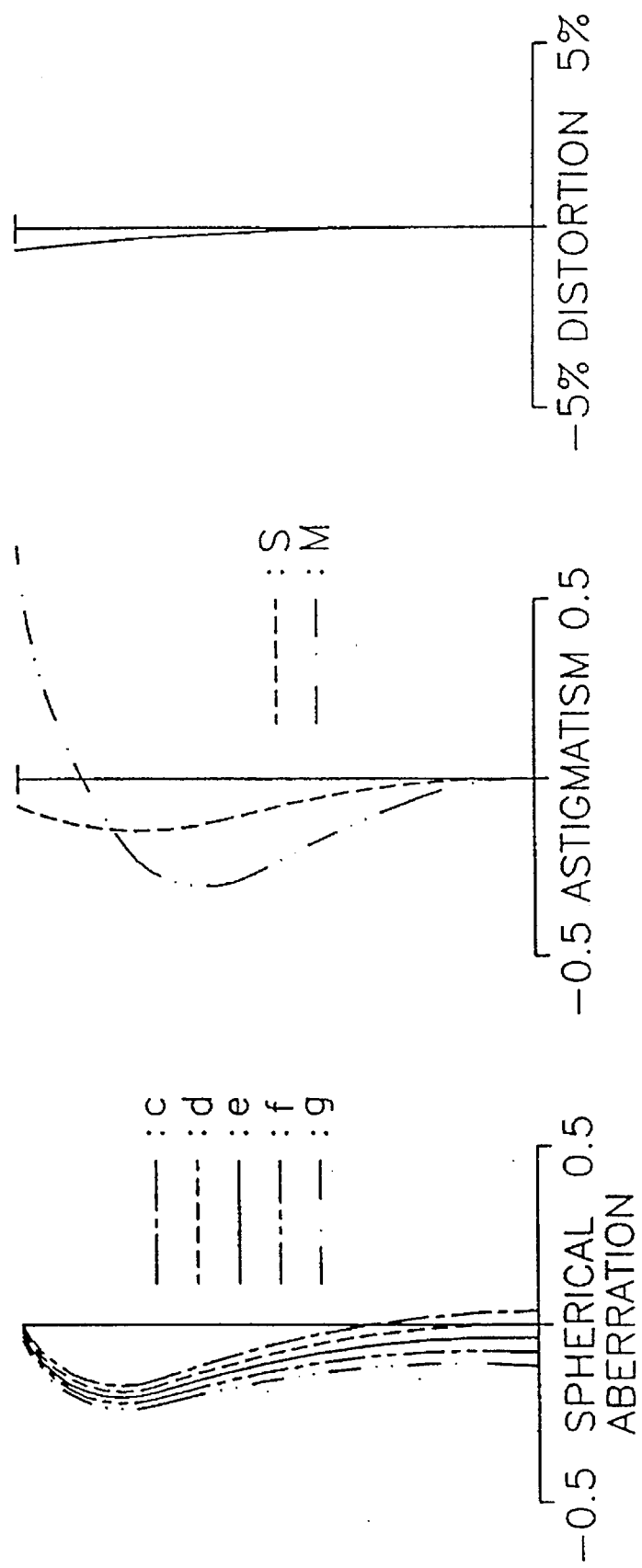

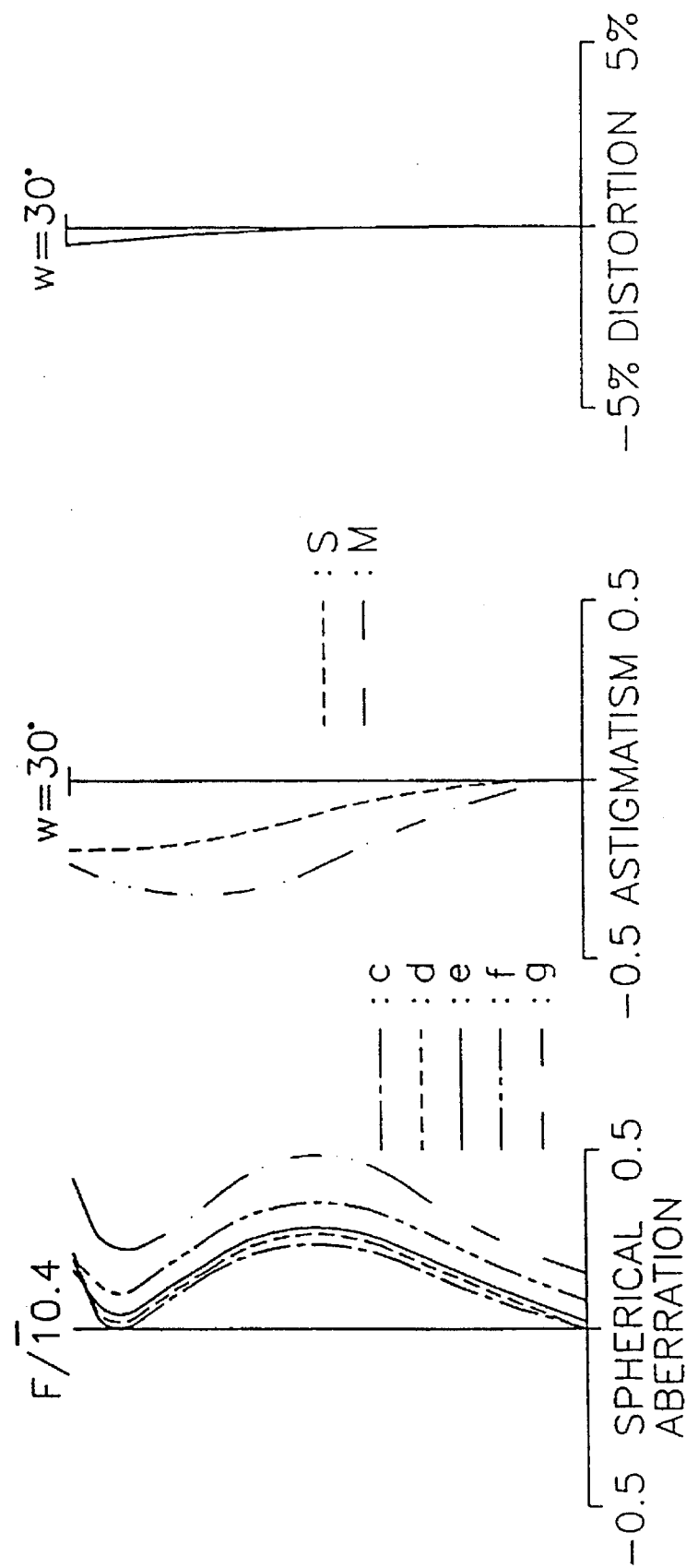

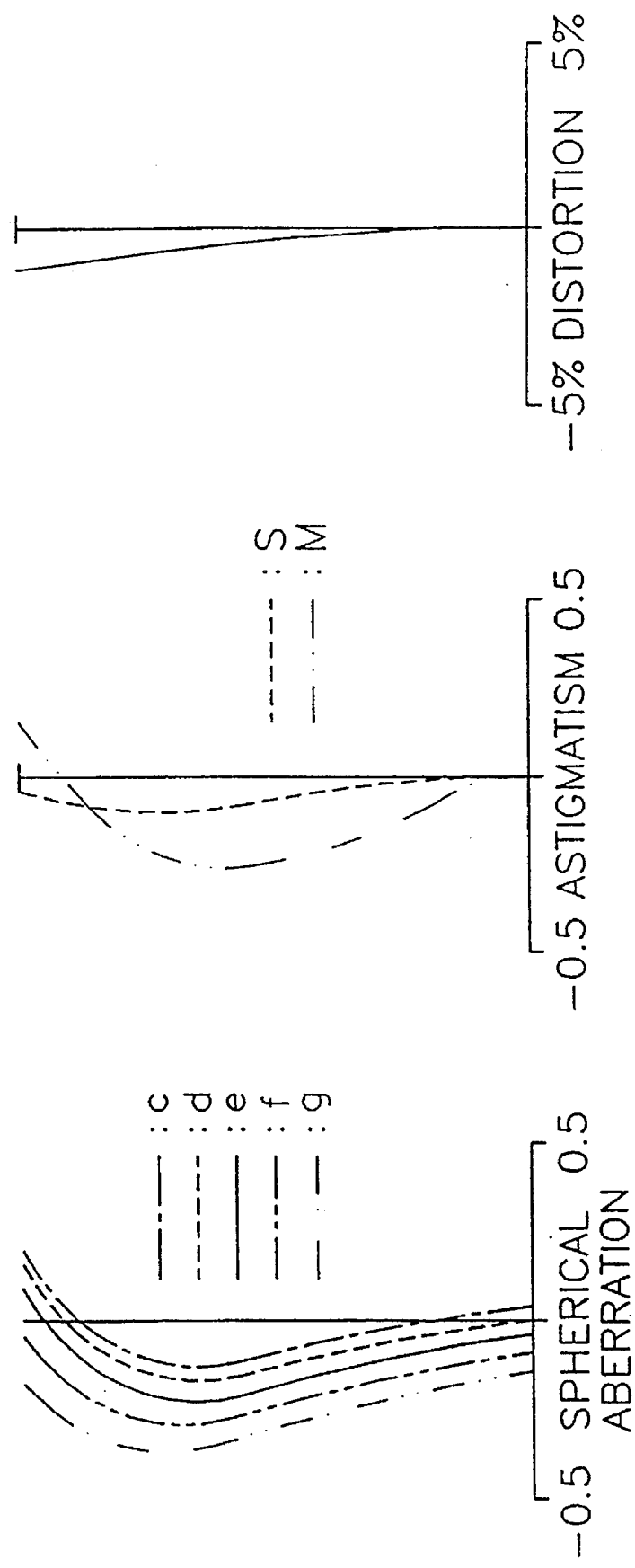

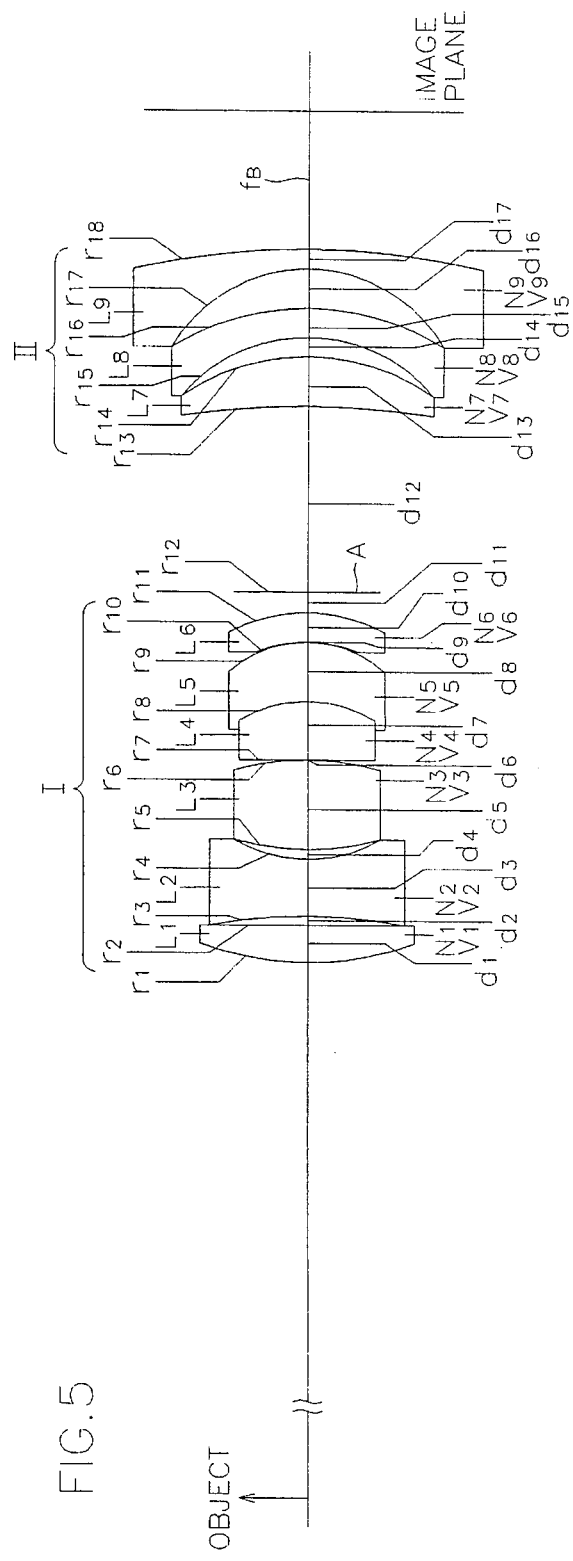
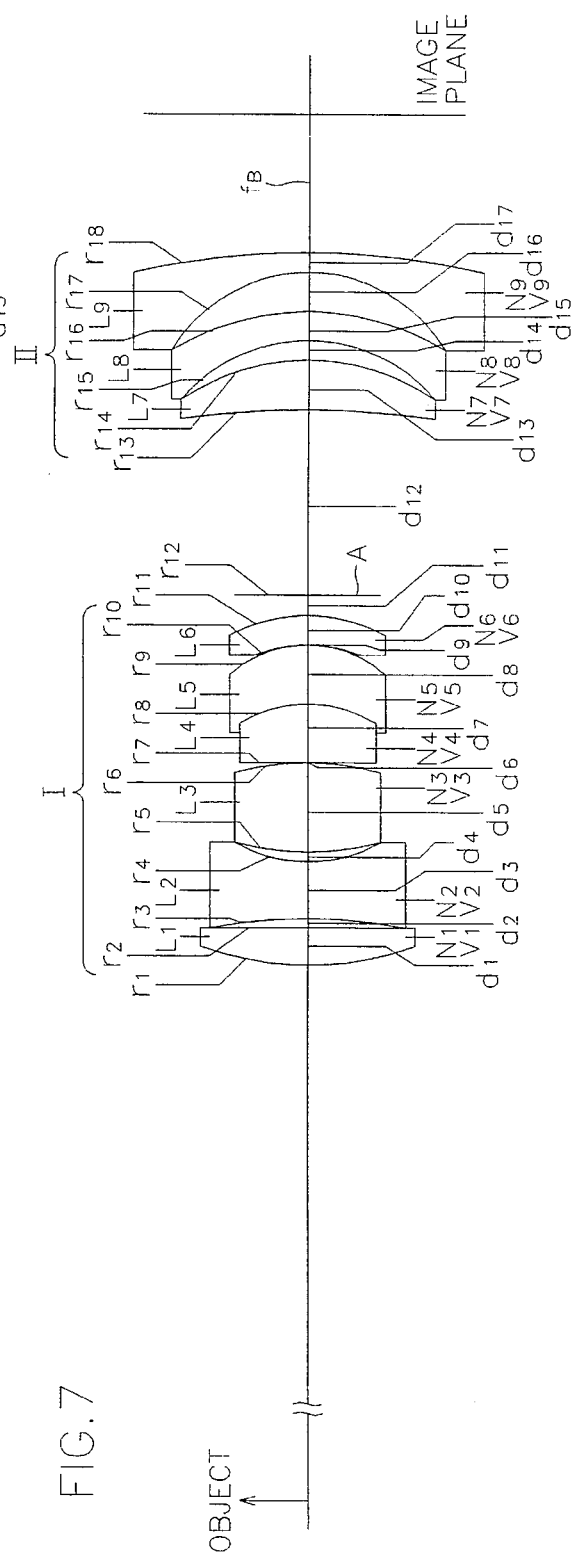

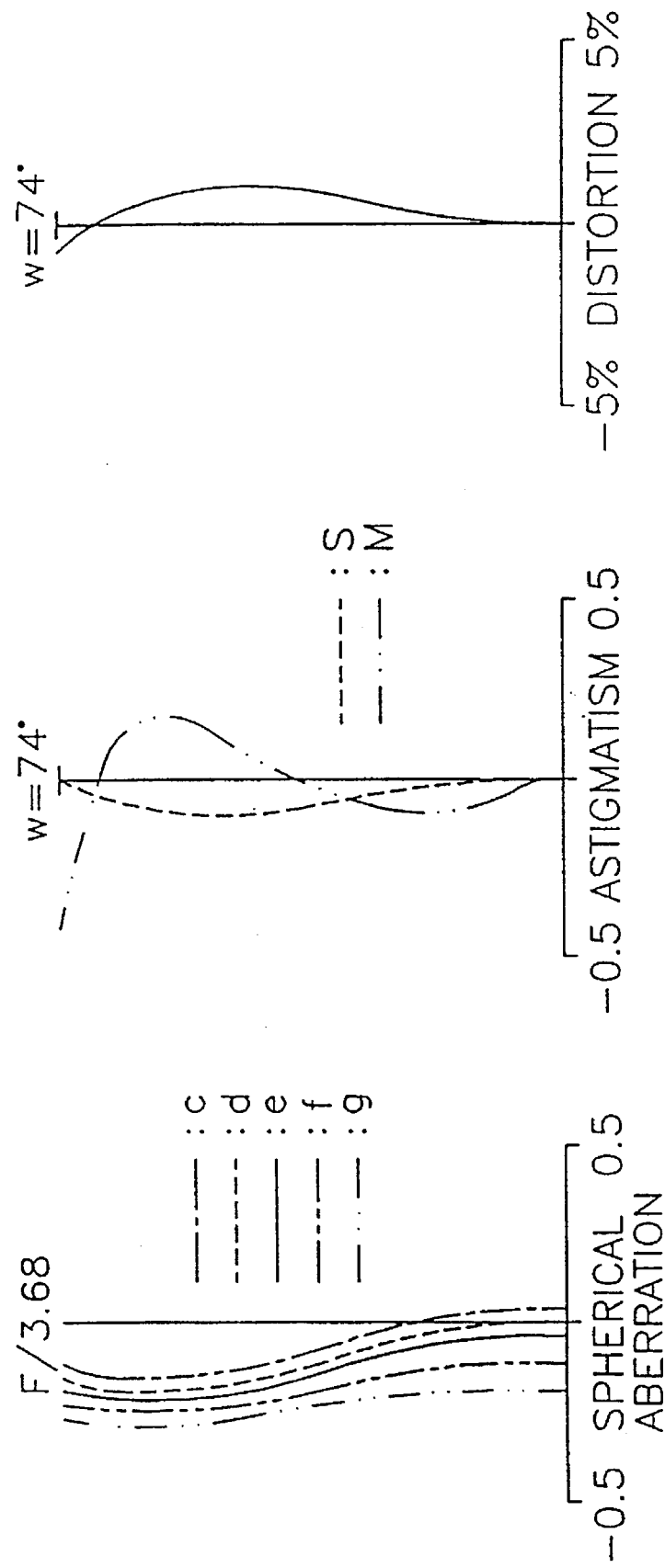

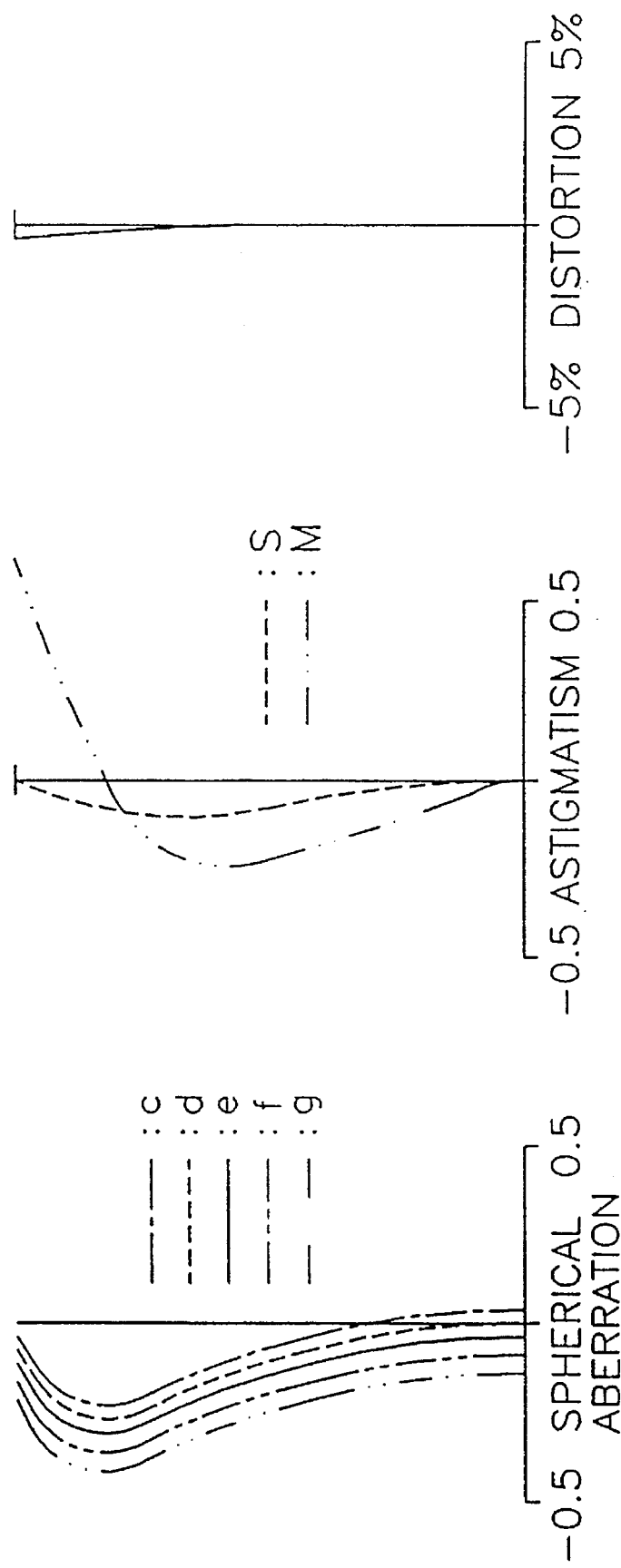

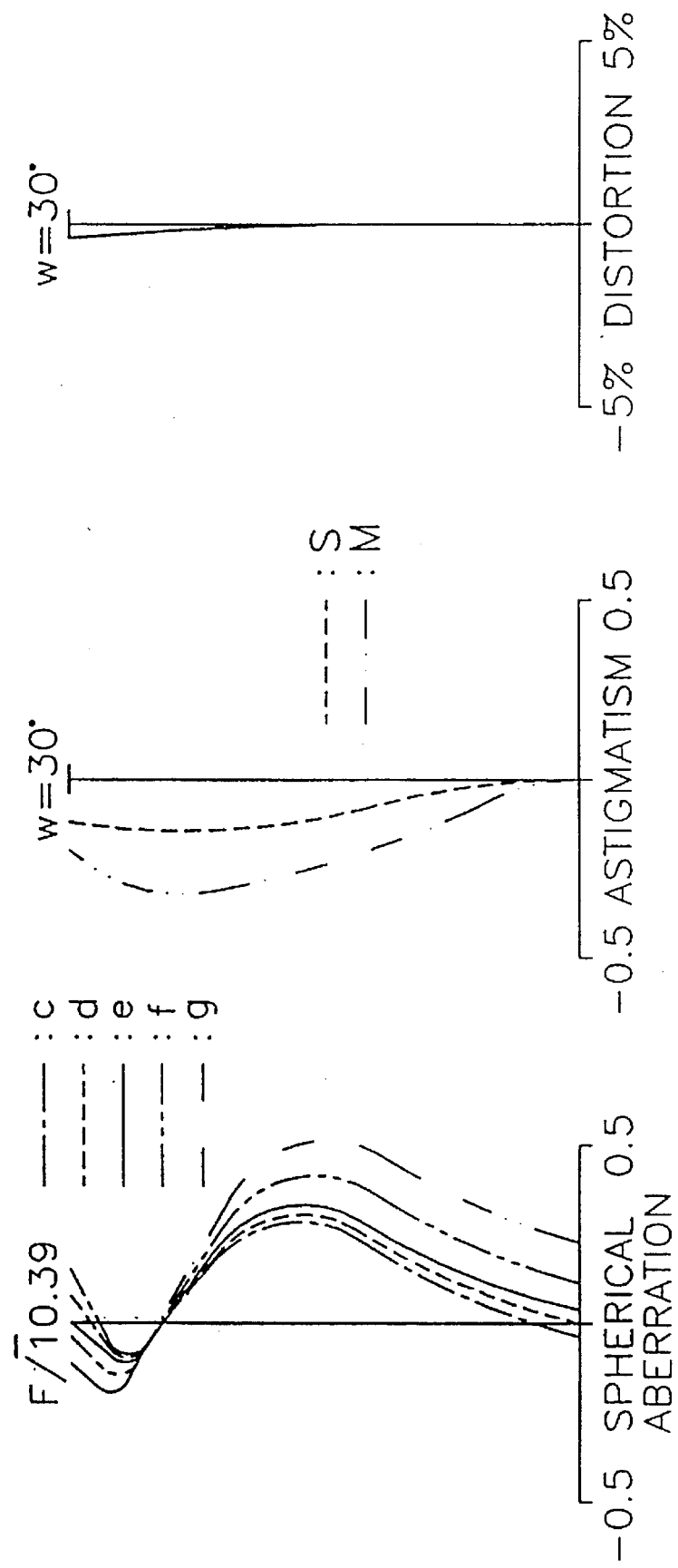

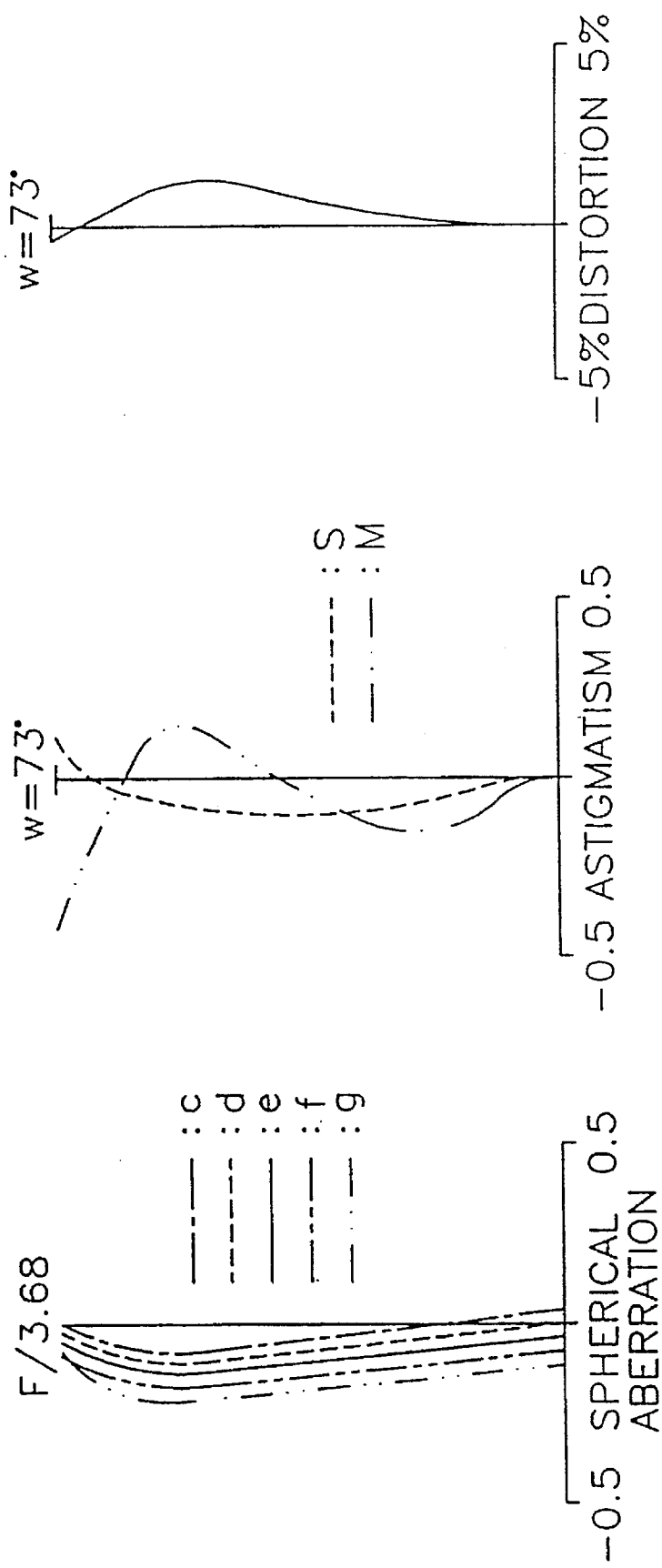

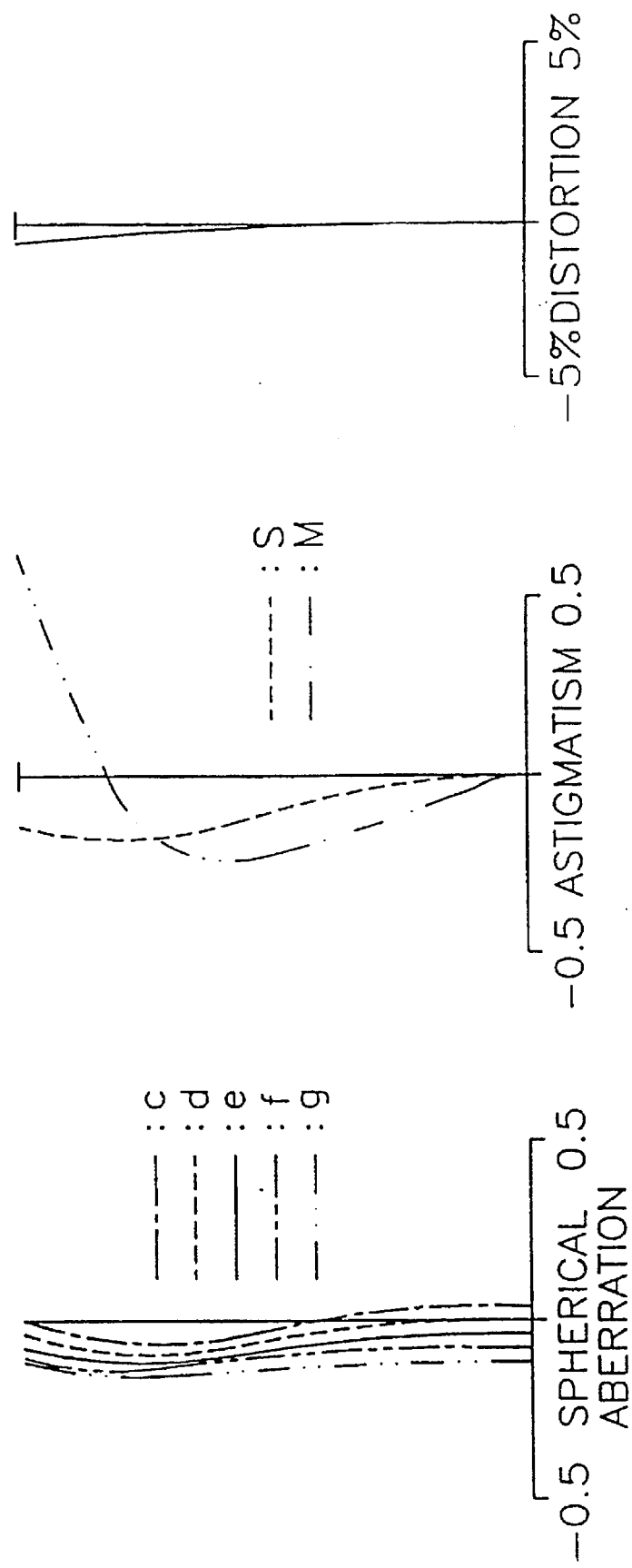

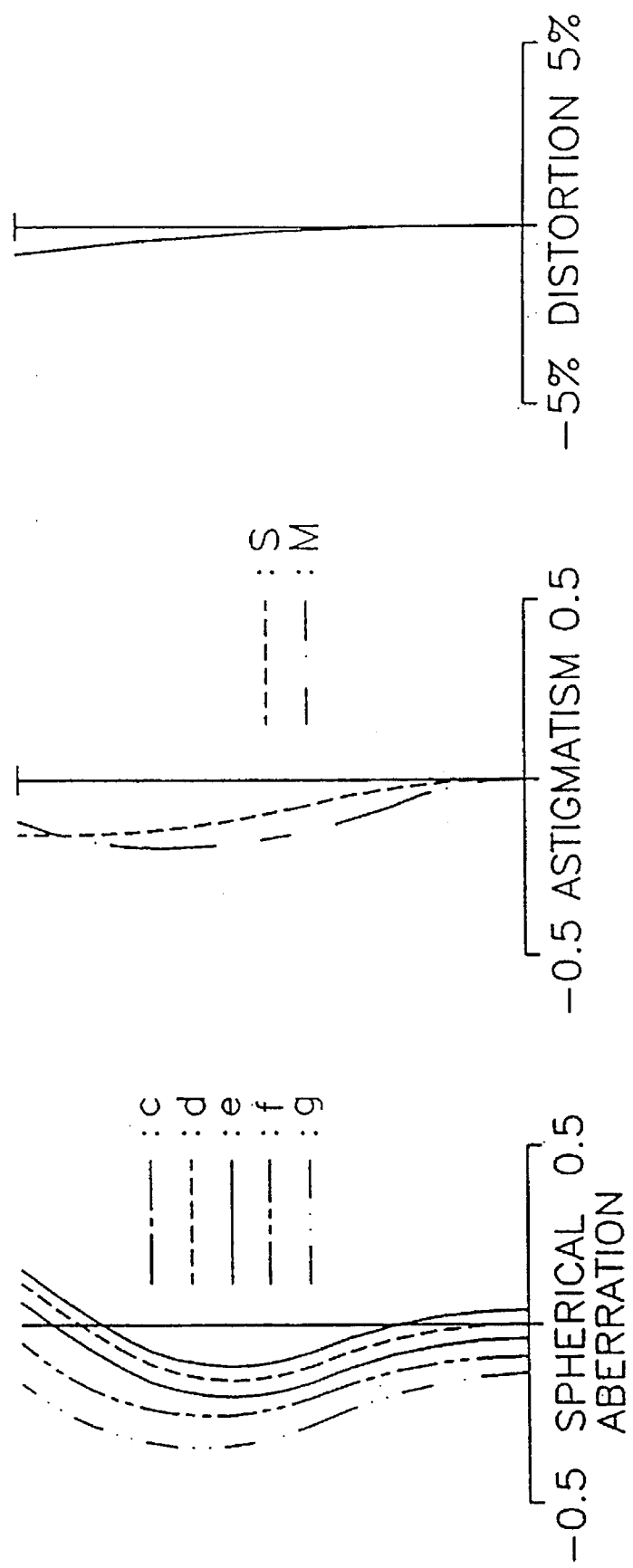

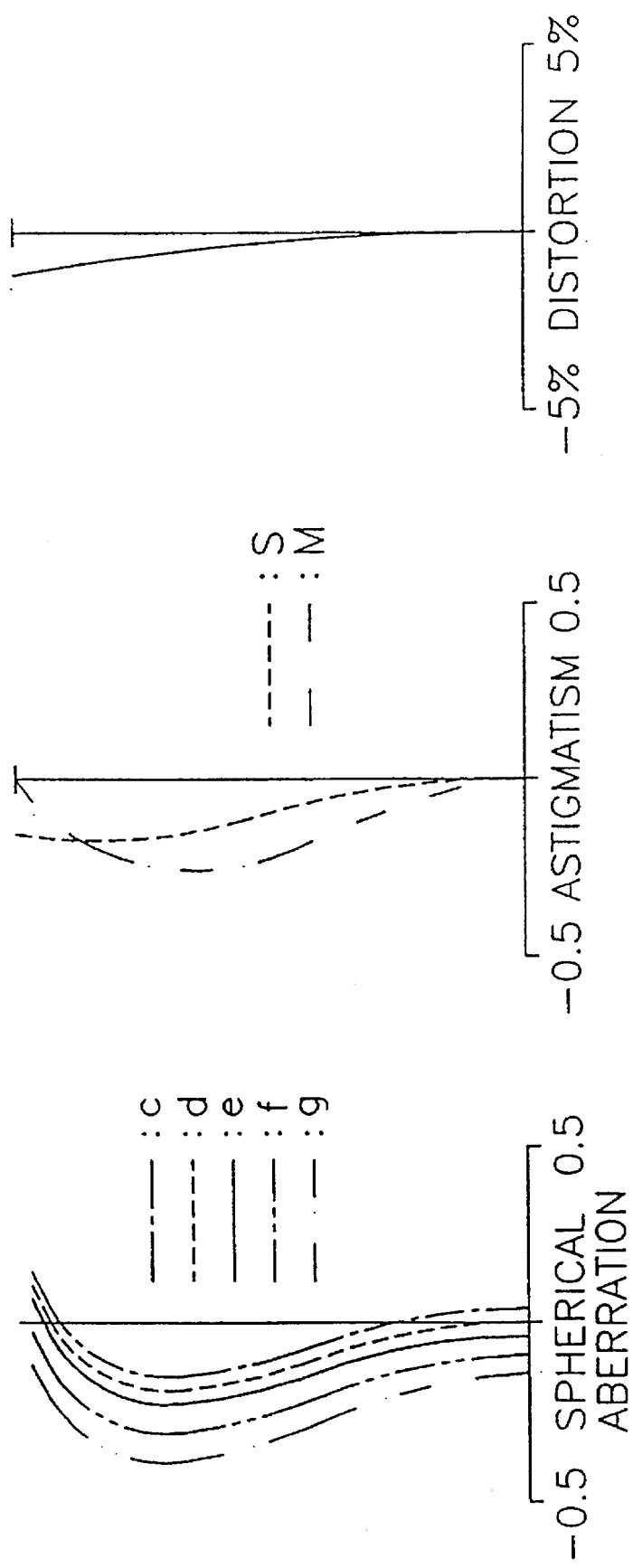

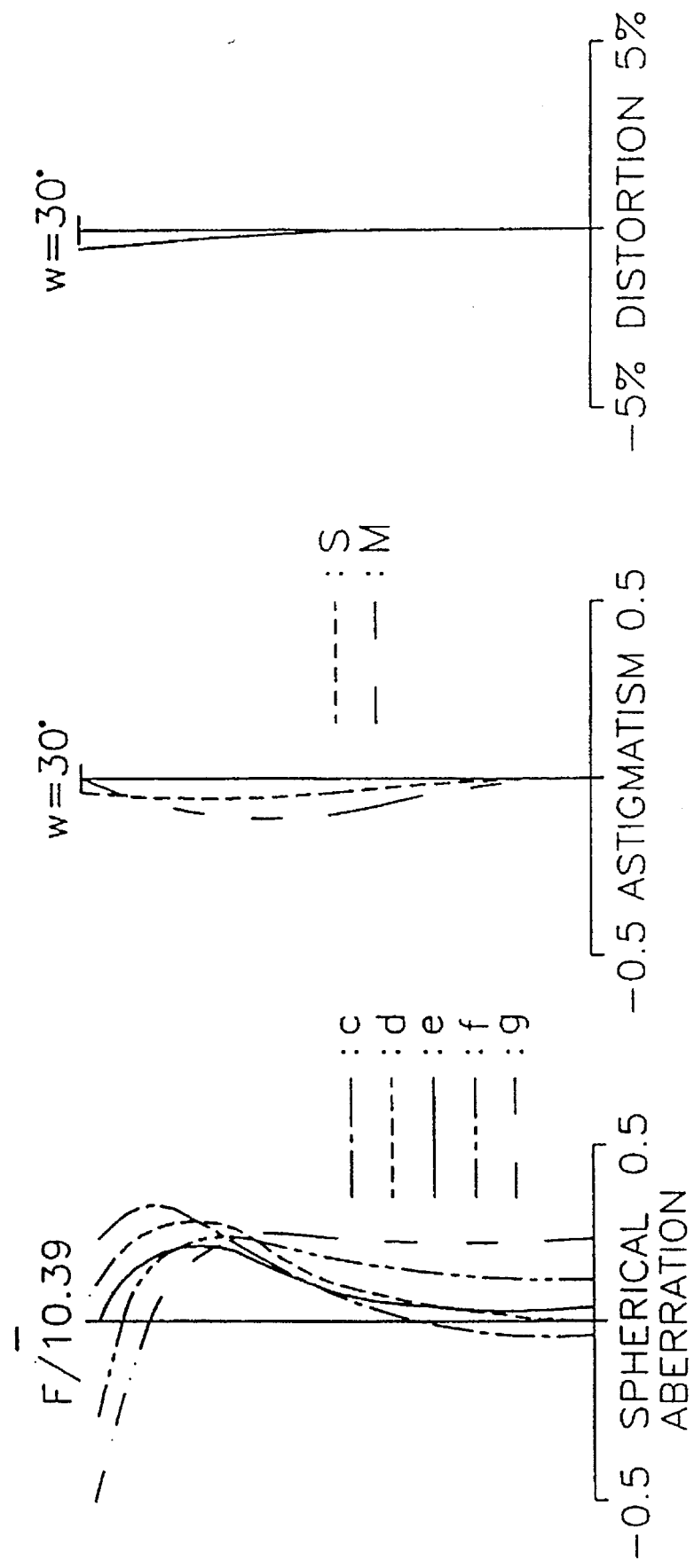

WIDE-ANGLE ZOOM LENS

BACKGROUND OF THE INVENTION

A. Field of the Invention

The present invention relates to a wide-angle zoom lens system designed for a leaf-shuttering compact camera. More particularly, it relates to a wide-angle zoom lens having a zoom ratio of more than 2.8 times while maintaining its compactness and constant wide angle of approximately 74 degrees.

B. Description of the Prior Art

Recently, leaf-shuttering cameras are becoming compact and automated, and zoom lenses whose focal length charges linearly have been widely used.

The zoom lens of the leaf-shuttering camera is required to have a high zoom ratio and a wide angle to take a picture of an object that is far away and is capable of photographing at a large view angle. Accordingly, zoom lenses have been highly developed, and a compact wide-angle zoom lens having a zoom ratio of more than 2.5 times and a view angle of 70 degrees, is disclosed in the Japanese Patent Unexamined Publication No. Hei 4-58207 (entitled "Compact Wide-Angle Zoom Lens, published on Feb. 25, 1992).

The wide-angle zoom lens system disclosed in the Japanese Patent Unexamined Publication No. 4-58207 has a high zoom ratio of 2.7 times and a maximum view angle of 72 degrees, and meets the two conditions somewhat. However, the lens system has ten elements of lenses and a short focal length from a telephoto angle position which degrades the photographing efficiency as to the object at a long distance.

SUMMARY OF THE INVENTION

The present invention overcomes the problems and disadvantages of the prior art by providing a zoom lens system which is compact and has a maximum view angle of approximately 74 degrees and a zoom ratio of more than 2.8 times.

In particular, the zoom lens system of the present invention has a long focal length from the telephoto angle position and nine elements of lenses to enhance the photographing sufficiency and provides excellent image formation performance.

To achieve the objects and in accordance with the purpose of the invention, as embodied and broadly described herein, a wide-angle zoom lens system comprises a first lens group having a positive refractive power; and a second lens group having a negative refractive power and spaced from the first lens group at a first distance, the first distance being variable during zooming, wherein the first lens group includes a first lens formed of a meniscus lens having a positive refractive power which is convex toward an object side, a second lens having a negative refractive power with both surfaces being concave, a third lens having a positive refractive power with both surfaces being convex, a fourth lens having a positive refractive power with both surfaces being convex, a fifth lens having a negative refractive power which is concave toward the object side, and a sixth lens having a positive refractive power with both surfaces being convex or meniscus; the second lens group includes lenses having a positive refractive power which is concave toward the object side, a meniscus lens, and at least one element of negative lens, wherein $$0.5 < f_1/f_2 < 0.82 \tag{1}$$

$$0.42 < |f_2/f_w| < 0.82, f_2 < 0; \tag{2}$$

and $$1.3 < m_{2w} < 1.9 \tag{3}$$

where $f_1$: focal length of the first lens group, $f_2$: focal length of the second lens group, $f_w$: focal length of the zoom lens system at a wide angle position, and $m_{2w}$: image formation magnification at a wide angle position.

In addition, there is provided a wide-angle zoom lens system, wherein $$3.4 < f_w/f_{wb} < 5.0; \tag{4}$$

and $$8.0 < f_w/D_t < 9.6 \tag{5}$$

where $f_w$: focal length of the zoom lens system at a wide angle position $f_{wb}$: back focus distance of the zoom lens system at a wide angle position, and $D_t$: distance from the first lens group to the second lens group at a telephoto position.

In addition, there is provided a wide-angle zoom lens system, wherein the zoom lens includes nine elements of lenses using at least one element of an aspheric lens and $$2.75 < f_t/f_w < 2.85 \tag{6}$$

where $f_t$: focal length at a telephoto position, and $f_w$: focal length at a wide angle position.

In the zoom lens of the present invention, relation (1) sets forth the focal length of the first lens group I. The focal length of the first lens group I is shortened, making the focal length at the wide angle position in an overall optical system short, thereby an enlarged maximum view angle can be obtained.

Accordingly, if the focal length of the first lens group I exceeds an upper limit, it is difficult to obtain the maximum view angle.

In order to make the focal length of the overall optical system short, the distance between the first lens group I and second lens group II should be enlarged. As a back focus distance of the overall optical range is made excessively short, the lens arranged at the very last end, i.e. the closest lens from the upper surface (the ninth lens L9 of this embodiment), has an enlarged outer diameter, which makes the size of the camera large and compactness is not obtainable.

On the other hand, if it falls below a lower limit of the range set forth in relation (1), the focal length of the overall optical system becomes short and the back focus distance becomes long. Moreover, the length on an optical axis of the overall optical system (the whole field of the lens) becomes short to obtain a large wide angle and makes the camera thin. However, a refractive power falls heavily on the first lens group I, and the compensation for generic aberrations, including spherical aberrations, is impossible to attain and a high image formation performance cannot be achieved.

If the focal length of the second lens group II exceeds the upper limit in relation (2), the focal length of the second lens group II becomes too large to attain compactness. If it falls below the lower limit of the range set forth in relation (2), the overall optical system may be compact and the high zoom ratio may be obtained. However, as the refractive power of the second lens group II becomes large, distortion aberrations and curvature of field become too large to attain the high image formation performance.

Relation (3) sets forth an optimal image formation ratio of the second lens group II, and shows a contrary positional relation between the first and second lens groups I and II.

Accordingly, in the condition set forth in relation (3), if the optimal magnification of the second lens group II at the wide angle position exceeds the upper limit, the refractive power of the first lens group I becomes excessive, thus making it difficult to compensate for aberrations like the spherical aberrations. On the other hand, if it falls below the lower limit of the range set forth in relation (3), a back focus distance at the wide angle position becomes too short and a diameter of the lens near the image plane of the second lens group II becomes large, such that it would make it difficult to make the system compact.

Relation (4) sets forth a range of the back focus distance at the wide angle position. If the back focus distance at the wide angle position exceeds the upper limit, it is difficult to compensate for generic aberrations such as the magnification in chromatic aberrations. On the other hand, if it falls below the lower limit of the range set forth in relation (4), the nearest diameter of the lens to the image plane becomes too large, such that it would make it difficult to make the system compact. In addition, this also makes it difficult to mount a panoramic photographic system because it affects disadvantageously to a design of the barrel.

Relation (5) relates to a distance (or thickness) between the first and second lens groups I and II at the wide angle position. In other words, the distance is long at the side angle position, but this becomes short, when, the change in magnification is made, such that lenses are transferred to the telephoto angle position.

In the condition set forth in relation (5), if the distance exceeds the upper limit, the distance between the first and second lens groups I and II becomes extremely short, making it difficult to assemble an aperture. On the other hand, if it falls below the lower limit of the range set forth in relation (5), the distance between the first and second lens groups I and II becomes long, making it difficult to obtain the high zoom ratio.

Relation (6) relates to a zoom ratio and a viewing angle. If the zoom ratio and the viewing angle exceed the upper limit, although a wide viewing angle can be obtained, it would make it difficult to obtain the high zoom ratio. On the other hand, if they fall below the lower limit of the range set forth in relation (6), although the high zoom ratio can be obtained, it would be difficult to obtain the wide viewing angle because the focal length at the wide angle position would be enlarged.

The present invention compensates for good aberrations to maintain high image formation performance in overall zoom ranges and attain compactness and high zoom ratio by satisfying each of the above relations.

Additional objects and advantages of the invention will be set forth in part in the description which follows, and in part will be obvious from the description, or may be learned by practice of the invention. The objects and advantages of the invention will be realized and attained by means of the elements and combinations particularly pointed out in the appended claims.

The accompanying drawings, which are incorporated in and constitute a part of this specification, illustrate one embodiment of the invention and together with the description, serve to explain the principles of the invention.

BRIEF DESCRIPTION OF THE DRAWINGS

FIG. 2A–2I show the extent of various aberrations associated with the zoom lens at (A) wide angle, (B) middle and (C) telephoto positions, according to the first preferred embodiment of the present invention.

FIGS. 4A–4I show the extent of various aberrations associated with the zoom lens at (A) wide angle, (B) middle and (C) telephoto positions, according to the second preferred embodiment of the present invention.

FIG. 5 is a sectional view of a wide-angle zoom lens according to a third preferred embodiment of the present invention.

FIGS. 6A–6I show the extent of various aberrations associated with the zoom lens at (A) wide angle, (B) middle and (C) telephoto positions, according to the third preferred embodiment of the present invention.

FIG. 7 is a sectional view of a wide-angle zoom lens according to a fourth preferred embodiment of the present invention.

FIGS. 8A–8I show the extent of various aberrations associated with the zoom lens at (A) wide angle, (B) middle and (C) telephoto positions, according to the fourth preferred embodiment of the present invention.

FIGS. 10A–10I show the extent of various aberrations associated with the zoom lens at (A) wide angle, (B) middle and (C) telephoto positions, according to the fifth preferred embodiment of the present invention.

FIGS. 12A–12I show the extent of various aberrations associated with the zoom lens at (A) wide angle, (B) middle and (C) telephoto positions, according to the sixth preferred embodiment of the present invention.

DESCRIPTION OF THE PREFERRED EMBODIMENTS

Reference will now be made in detail to preferred embodiments of the present invention, examples of which are illustrated in the accompanying drawings in reference to the drawings. Wherever possible, the same reference numbers will be used throughout the drawings to refer to the same or like parts.

Figure 1:
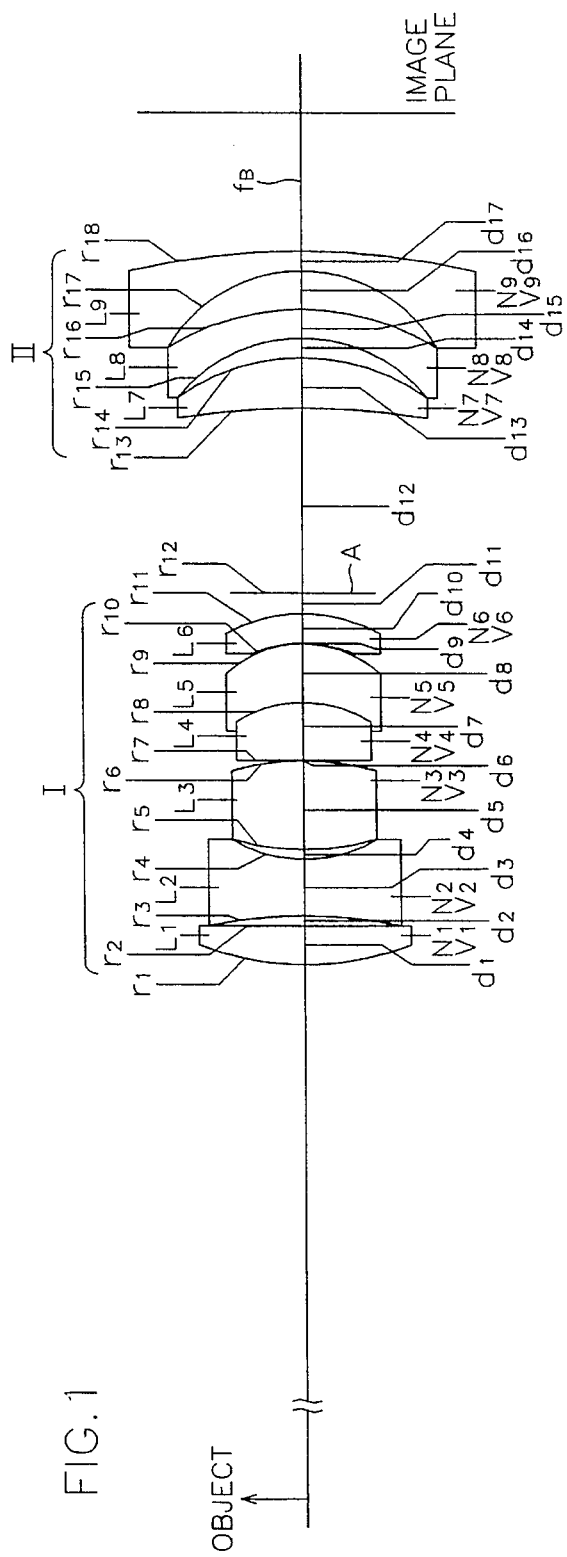
FIG. 1 is a sectional view of a wide-angle zoom lens according to a first preferred embodiment of the present invention.

FIG. 1 is a side-sectional view of a wide angle zoom lens system in accordance with a first preferred embodiment of the present invention.

The zoom lens system includes a first lens group I having a positive refractive power from the object side, a second lens group II having a negative refractive power, and a conventional aperture A. Magnification is changed by changing the distance between the lens groups I and II.

The first lens group I includes a first lens L1 formed of a meniscus lens having a positive refractive power whose surface toward the object side is convex; a second lens L2 having concave surfaces and, having a negative refractive power; a third lens L3 having convex surfaces and, having a positive refractive power; a fourth lens L4 having convex surfaces and, having a positive refractive power; a fifth lens L5, whose surface toward the object side is concave, having a negative refractive power; and a sixth lens L6 either having convex surfaces or formed of meniscus lenses and, having a positive refractive power.

The second lens group II includes a seventh lens L7 that is formed of meniscus lens and has a concave surface toward the object side and a positive refractive power, and eighth and ninth lenses L8 and L9 formed of at least one element of negative refractive power, preferably satisfying the following relations:

Relation (1) $0.52 < f1/f_w < 0.82$

Relation (2) $0.42 < |f2/f_w| < 0.82$

Relation (3) $1.33 < m2w < 1.85$ where f1 is the focal length of the first lens group, f2 is the focal length of the second lens group, $f_w$ is the focal length at the wide end, and $m_{2w}$ is an image formation ratio of the second lens group at the wide end.

In the first lens group I of positive refractive power and the second lens group II of negative refractive power, infinite object point at the wide angle position and telephoto angle position satisfies the following relations:

Relation (4) $3.4 < f_w/f_{wb} < 5.0$

Relation (5) $8.0 < f_w/D_t < 9.6$ where $f_w$ is the focal length at the wide angle position, $f_{wb}$ is the back focus distance at the wide angle position, $D_t$ is a distance between the first lens group and the second lens group at the telephoto angle position.

The zoom lens system includes a first lens group I having a positive refractive power and a second lens group II having a negative refractive power, and is constructed with nine elements of spherical lenses or nine elements of lenses by means of more than one aspheric surface lens.

This lens system satisfies the following relation:

Relation (6) $2.75 < f_t/f_w < 2.85$ where $f_w$ is the focal length at the wide angle position and $f_t$ is the focal length at the telephoto angle position.

In the zoom lens of the present invention, relation (1) relates to the focal length of the first lens group I, and make the focal length of the first lens group I short. Thus, the focal length at the wide angle position in the overall optical system is shortened, more enlarged maximum viewing angle can be obtained.

Accordingly, if the focal length of the first lens group I, the maximum viewing angle cannot be obtained.

In order to make the focal length of the overall optical system short, the distance between the first lens group I and second lens group II should be enlarged. As the back focus distance of the overall optical range is made excessively short, the lens arranged at the very end, i.e. the closest lens from the upper surface (the ninth lens L9 of this embodiment) has an enlarged outer diameter, which makes the size of the camera large and compactness is not obtainable.

On the other hand, if it falls below the lower limit of the range set forth in relation (1), the focal length of the overall optical system becomes short and the back focus distance becomes long.

Moreover, the length at the optical axis of the overall optical system (the whole field of the lens) becomes short to obtain a large wide angle and makes the camera thin. However, the refractive power falls heavily on the first lens group I, and the compensation for generic aberrations including spherical aberrations, is impossible to attain and a high image formation performance cannot be achieved.

If the focal length of the second lens group II exceeds the upper limit in relation (2), the focal length of the second lens group II becomes too large to attain compactness. On the other hand, if it falls below the lower limit of the range set forth in relation (2), the overall optical system may be compact and high zoom ratio may be obtained.

However, as the refractive power of the second lens group II becomes large, distortion aberrations and curvature of field become too large to attain the high image formation performance.

Relation (3) relates to an image formation ratio of the second lens group II, and shows a contrary positional relation between the first and second lens groups I and II.

Accordingly, in the condition set forth in relation (3), if the optimal magnification of the second lens group II at the wide angle position exceeds the upper limit, the refractive power of the first lens group I becomes excessive, thus making it difficult to compensate for aberrations like the spherical aberrations. On the other hand, if it falls below the lower limit of the range set forth in relation (3), the back focus distance at the wide angle position becomes too short and a diameter of the lens near the image plane of the second lens group II becomes large, such that it would make it difficult to make the system compact.

Relation (4) sets forth a range of the back focus distance at the wide angle position. If the back focus distance at the wide angle position exceeds the upper limit, it is difficult to compensate for generic aberrations such as the magnification in chromatic aberrations. On the other hand, if it falls below the lower limit of the range set forth in relation (4), the nearest diameter of the lens to the image plane becomes too large, such that it would make it difficult to make the system compact. In addition, this also makes it difficult to mount a panoramic photographic system because it affects disadvantageously to a design of the barrel.

Relation (5) relates to a distance (or thickness) between the first and second lens groups I and II at the wide angle position. In other words, the distance is long at the side angle position, but this becomes short, when the change in magnification is made, such that the lenses are transferred to the telephoto angle position.

In the condition set forth in relation (5), if the distance exceeds the upper limit, the distance between the first and second lens groups I and II becomes extremely short, making it difficult to assemble an aperture. On the other hand, if it falls below the lower limit of the range set forth in relation (5), the distance between the first and second lens groups I and II becomes long, making it difficult to obtain a high zoom ratio.

Relation (6) relates to a zoom ratio and a viewing angle. If the zoom ratio and the viewing angle exceed the upper limit, although a wide viewing angle can be obtained, it would make it difficult to obtain the high zoom ratio. On the other hand, if they fall below the lower limit of the range set forth in relation (6), although the high zoom ratio can be obtained, it would be difficult to obtain the wide viewing angle because the focal length at the wide angle position would be enlarged.

As described above, when the above-mentioned conditions are satisfied in the preferred embodiment of the present invention, the compensation for the aberrations having the high performance is made as shown in FIG. 2A–2I, maintaining the image formation performance in the overall zoom range while simultaneously being compact and having the high zoom ratio.

A relation between the conditions according to the first preferred embodiment of the present invention and various numbers according to the preferred embodiment of number is provided in Table 1, where $F_{no}$ is an F number, namely, brightness, f is the focal length, $f_B$ is the back focus distance, $\omega$ is a half view angle, d is a thickness of the lens or a distance, N is a refractive index of d-line, and $\upsilon$ is an ABBE number of the lens.

In addition, an aspheric surface form is represented as follows;

$$X = \frac{Cy^2}{1 + \{1 - (K+1)C^2y^2\}^{1/2}} + A_4y^4 + A_6y^6 + A_8y^8 + A_{10}y^{10} \quad (7)$$

where

X: distance in a direction of an optical axis from an apex of the lens y: distance in a vertical direction from the optical axis C: reciprocal number of curvature radius in the apex of the lens K: conic constant $A_4, A_6, A_8, A_{10}$: aspheric surface coefficients

TABLE 1

$F_{NO}$ = 1:3.68–10.4
f = 29.019–81.996
$\omega$ = 74.41°–29.68°
$f_B$ = 8.5–60.59

| surface number | r | d | N | $\upsilon$ |
|---|---|---|---|---|
| 1 | 23.208 | 2.30 | 1.56732 | 42.84 |
| 2 | 156.500 | 0.80 | | |
| 3 | –30.935 | 3.50 | 1.83400 | 37.34 |
| 4 | 9.811 | 0.50 | | |
| 5 | 15.649 | 5.47 | 1.69895 | 30.05 |
| 6 | –40.881 | 0.10 | | |
| 7 | 41.689 | 3.46 | 1.49700 | 81.61 |
| 8 | –7.705 | 2.96 | 1.83400 | 37.34 |
| 9 | –14.323 | 0.10 | | |
| 10 | –40.155 | 1.92 | 1.51680 | 64.20 |
| 11 | –11.908 | 1.00 | | |
| 12 | ∞ | 10.60–2.51 | | |
| 13 | –38.268 | 3.15 | 1.73077 | 37.99 |
| 14 | –15.851 | 1.54 | | |
| 15 | –11.334 | 1.40 | 1.72000 | 50.34 |
| 16 | –19.920 | 2.40 | | |
| 17 | –11.109 | 1.30 | 1.71300 | 53.94 |
| 18 | –78.834 | $f_B$ | | |

The conic constant and the aspheric surface coefficients of r13 are as follows;
K; –3.150088716279
$A_4$; 0.3884590714936×10$^{-4}$
$A_6$; 0.2067380684665×10$^{-5}$
$A_8$; –0.2026593446969×10$^{-7}$
$A_{10}$; 0.4096659823929×10$^{-10}$ The conic constant and the aspheric surface coefficients of r14 are as follows;
K; 0.2633138869758
$A_4$; 0.2102250849514×10$^{-5}$
$A_6$; 0.1033128832532×10$^{-5}$
$A_8$; 0.7292045008095×10$^{-8}$
$A_{10}$; –0.2371001846681×10$^{-9}$ The values of conditions disclosed in relations (1) to (6) are as follow;
Relation (1) $f_1/f_2$; 0.662
Relation (2) $|f_2/f_w|$; 0.651
Relation (3) $m_{2w}$; 1.51
Relation (4) $f_w/f_{wb}$; 3.414
Relation (5) $f_w/D_t$; 8.265
Relation (6) $f_t/f_w$; 2.826

Figure 3:
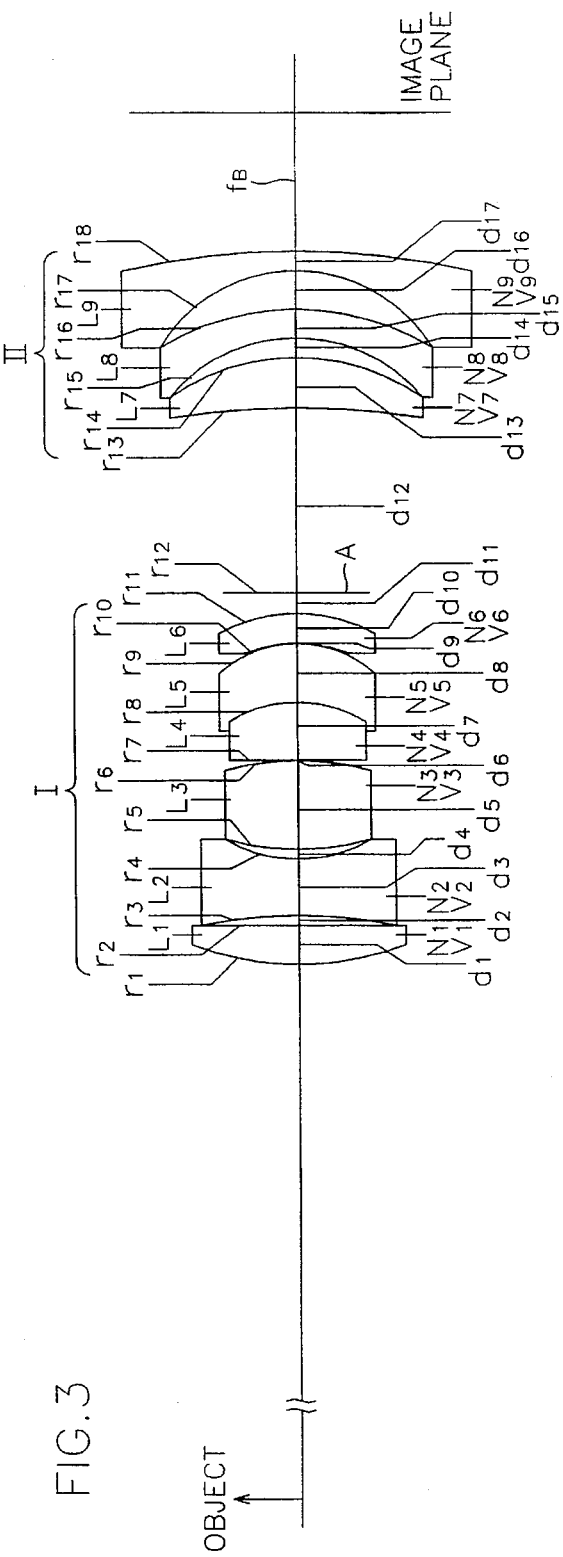
FIG. 3 is a sectional view of a wide-angle zoom lens according to a second preferred embodiment of the present invention.
Figures 4A, 4B, 4C:
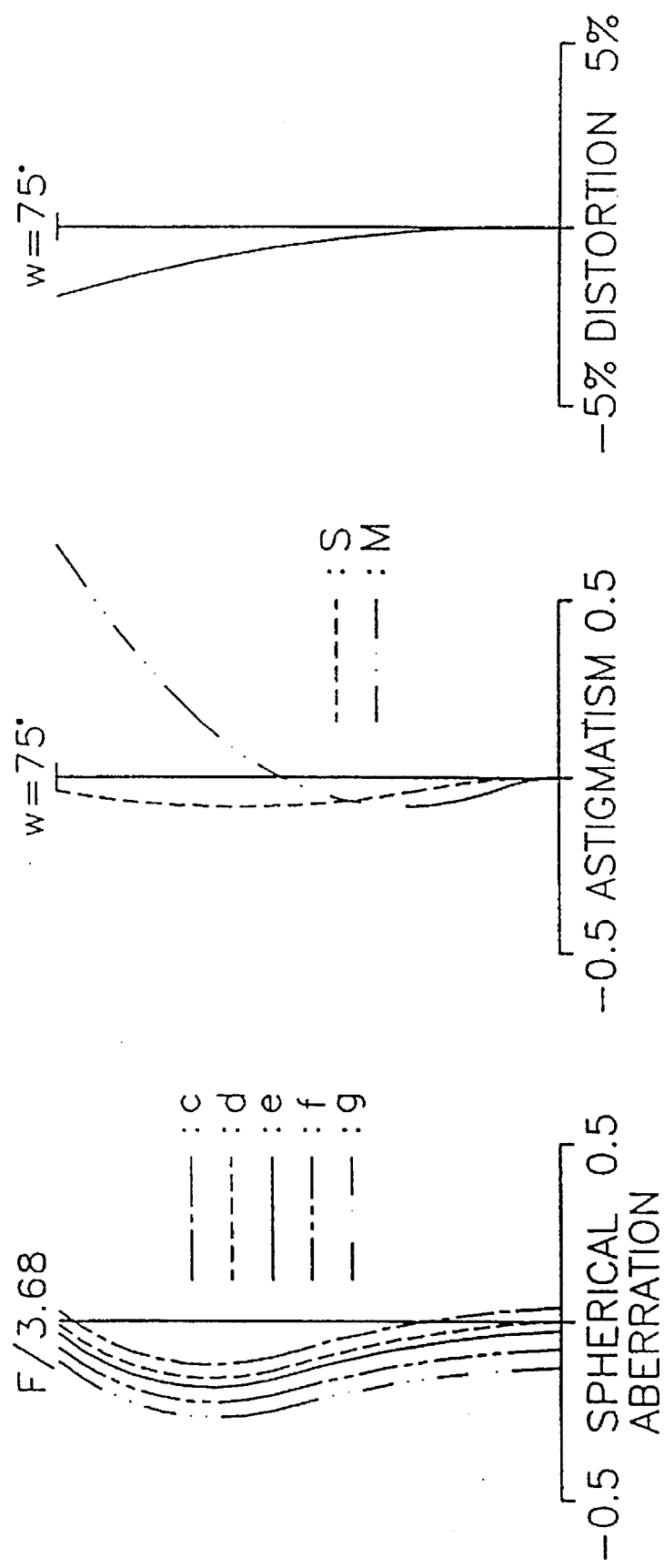
Figures 4G, 4H, 4I:
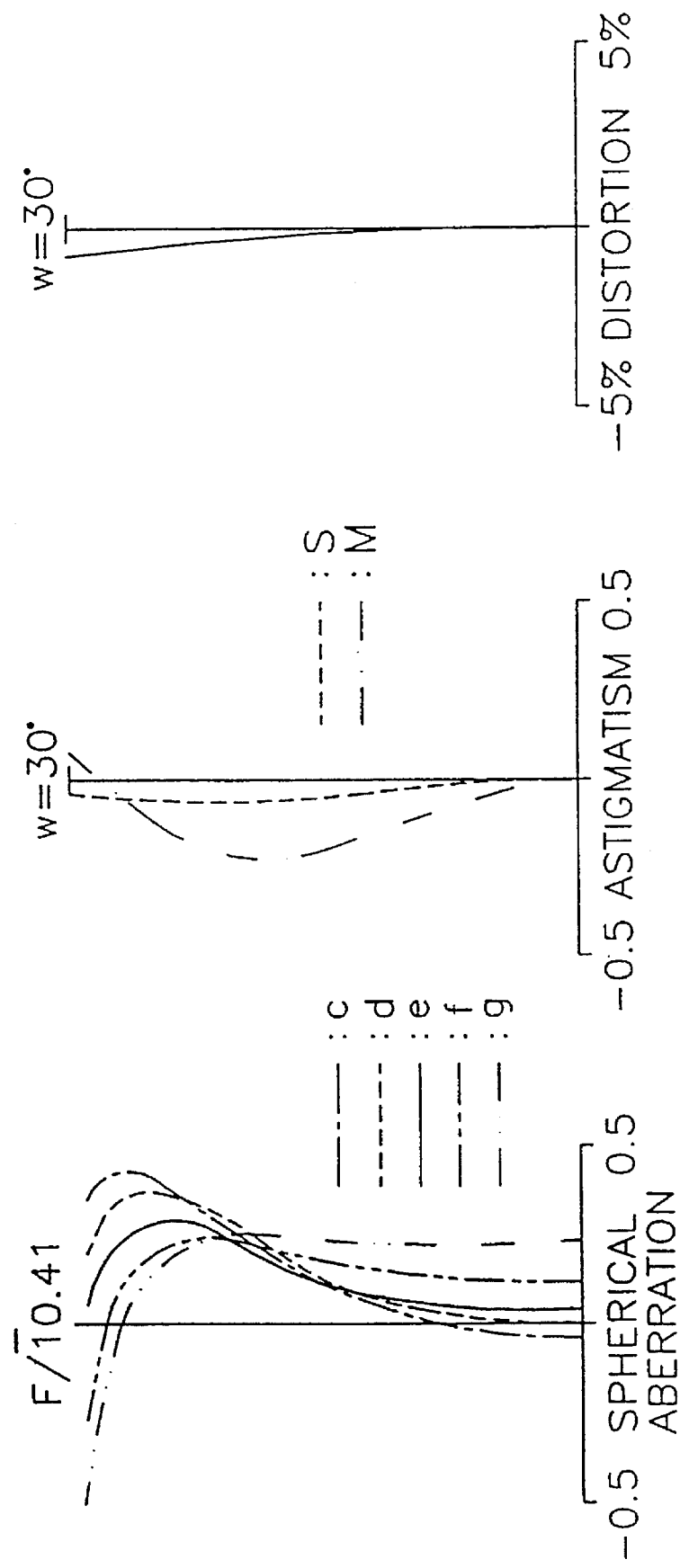
Figures 8G, 8H, 8I:
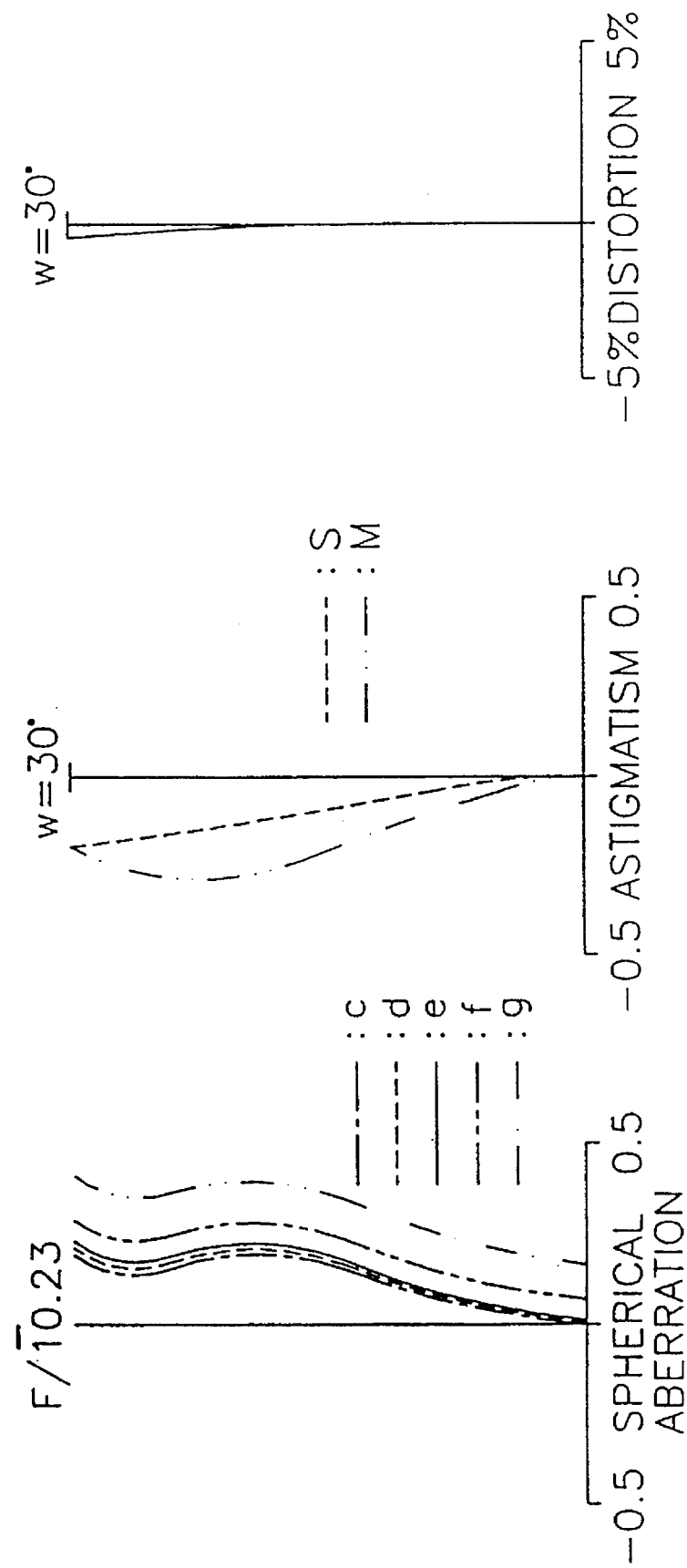

FIG. 3 refers to the zoom lens system according to the second preferred embodiment of the present invention. The zoom lens system comprises a first lens group I having a positive refractive power from an object side, a second lens group II having a negative refractive power and a conventional aperture A.

In the zoom lens system, as embodied herein, preferably the distance between the first and second lens groups I and II is varied during zooming, and the zoom lens system satisfies the conditions of the first preferred embodiment of the present invention. Accordingly, the compensation for the extent of the aberrations having the high performance is made, as shown in FIGS. 4A–4I, and an effect of the operation is identical to that of the first preferred embodiment of the present invention.

A relation between the conditions according to the second preferred embodiment of the present invention and various numbers according to the preferred embodiment of number is provided in Table 2.

TABLE 2

$F_{NO}$ = 1:3.68–10.41
f = 29.028–82.132
$\omega$ = 74.93°–29.71°
$f_B$ = 8.51–60.08

| surface number | r | d | N | $\upsilon$ |
|---|---|---|---|---|
| 1 | 29.426 | 2.30 | 1.56732 | 42.84 |
| 2 | 110.012 | 0.80 | | |
| 3 | –35.891 | 2.43 | 1.80420 | 46.50 |
| 4 | 12.004 | 0.50 | | |
| 5 | 18.130 | 2.88 | 1.64769 | 33.84 |
| 6 | –1494.739 | 0.38 | | |
| 7 | 25.296 | 5.50 | 1.49700 | 81.61 |
| 8 | –7.232 | 4.50 | 1.83400 | 37.34 |
| 9 | –13.676 | 0.36 | | |
| 10 | 237.843 | 1.92 | 1.51580 | 64.20 |
| 11 | –17.445 | 1.00 | | |
| 12 | ∞ | 10.31–2.50 | | |
| 13 | –49.256 | 2.47 | 1.72000 | 43.90 |
| 14 | –15.453 | 1.58 | | |
| 15 | –14.911 | 1.40 | 1.72250 | 49.62 |
| 16 | –99.496 | 3.23 | | |
| 17 | –12.009 | 1.30 | 1.71300 | 53.94 |
| 18 | –48.744 | $f_B$ | | |

The conic constant and the aspheric surface coefficients of r1 are as follows;
K; –0.5460015507258
$A_4$; –0.1580208730104×10$^{-5}$
$A_6$; –0.4780586170732×10$^{-6}$
$A_8$; 0.1425807030408×10$^{-7}$
$A_{10}$; –0.1622302301838×10$^{-9}$ The values of condition disclosed in relations (1) to (6) are as follow;
Relation (1) $f_1/f_w$; 0.655
Relation (2) $|f_2/f_w|$; 0.636
Relation (3) $m_{2w}$; 1.528
Relation (4) $f_w/f_{wb}$; 3.412
Relation (5) $f_w/D_t$; 8.294

Relation (6) $f_t/f_w$; 2.829

FIG. 5 refers to the zoom lens system according to a third preferred embodiment of the present invention. The zoom lens system comprises a first lens group I having a positive refractive power from an object side, and a second lens group II having a negative refractive power, and a conventional aperture A.

In the zoom lens system, as embodied herein, preferably the distance between the first and second lens groups I and II is varied during zooming, and the zoom lens system satisfies the conditions of the first preferred embodiment of the present invention. Accordingly, the compensation for the extent of the aberrations having the high performance is made, as shown in FIGS. 6A–6I, and an effect of the operation is identical to that of the first preferred embodiment of the present invention.

A relation between the conditions according to the third preferred embodiment of the present invention and various numbers according to the preferred embodiment of number is provided in Table 3.

TABLE 3

$F_{NO} = 1:3.68–10.39$
$f = 28.993–81.847$
$\omega = 74.08°–29.64°$
$f_B = 8.05–53.36$

| surface number | r | d | N | v |
| --- | --- | --- | --- | --- |
| 1 | 19.243 | 2.30 | 1.54072 | 47.20 |
| 2 | 90.144 | 0.95 | | |
| 3 | −28.817 | 3.50 | 1.83400 | 37.34 |
| 4 | 9.320 | 0.50 | | |
| 5 | 14.283 | 3.71 | 1.69895 | 30.05 |
| 6 | −36.931 | 0.10 | | |
| 7 | 29.512 | 3.14 | 1.49700 | 81.61 |
| 8 | −7.44 | 3.36 | 1.8340 | 37.34 |
| 9 | −13.946 | 0.10 | | |
| 10 | −86.530 | 1.92 | 1.51680 | 64.20 |
| 11 | −12.051 | 1.00 | | |
| 12 | ∞ | 7.031–2.06 | | |
| 13 | −27.449 | 3.11 | 1.72342 | 37.99 |
| 14 | −14.671 | 1.50 | | |
| 15 | −9.182 | 1.75 | 1.72000 | 50.34 |
| 16 | −25.279 | 2.91 | | |
| 17 | −9.527 | 1.30 | 1.71300 | 53.94 |
| 18 | −24.072 | $f_B$ | | |

The conic constant and aspheric surface coefficients of r13 are as follows;
K; −14.22604420528
$A_4$; 0.9457734331332×10$^{-4}$
$A_6$; 0.4974152040078×10$^{-5}$
$A_8$; −0.5781046970933×10$^{-7}$
$A_{10}$; 0.5486767653756×10$^{-9}$ The conic constant and aspheric surface coefficients of r14 are as follows;
K; −0.6763777049825
$A_4$; 0.3996822694902×10$^{-4}$
$A_6$; 0.2492726584456×10$^{-5}$
$A_8$; −0.1881033826834×10$^{-8}$
$A_{10}$; −0.1214108316474×10$^{-9}$ The values of conditions disclosed in the relations (1) to (6) are as follows;
Relation (1): $f_1/f_w$; 0.556
Relation (2): $f_2/f_w$; 0.477
Relation (3): $m_{2w}$; 1.798
Relation (4): $f_w/f_{wb}$; 3.602
Relation (5): $f_w/D_i$; 9.463
Relation (6): $f_t/f_w$; 2.823

FIG. 7 refers to the zoom lens system according to a fourth preferred embodiment of the present invention. The zoom lens system comprises a first lens group I having a positive refractive power from an object side, a second lens group II having a negative refractive power, and a conventional aperture A.

In the zoom lens system, as embodied herein, preferably the distance between the first and second lens groups I and II is varied during zooming, and the zoom lens system satisfies the conditions of the first preferred embodiment of the present invention. Accordingly, the compensation for the extent of the aberrations having the high performance is made, as shown in FIGS. 8A–8I, and an effect of the operation is identical to that of the first preferred embodiment of the present invention.

A relation between the conditions according to the fourth preferred embodiment of the present invention and various numbers according to the preferred embodiment of number is provided in Table 4.

TABLE 4

$F_{no} = 1:3.68–10.23$
$f = 29.504–82.024$
$\omega = 72.92°–29.73°$
$f_B = 6.51–61.17$

| Surface Number | r | d | N | v |
| --- | --- | --- | --- | --- |
| 1 | 18.218 | 2.30 | 1.54072 | 47.20 |
| 2 | 92.474 | 2.00 | | |
| 3 | −35.925 | 1.00 | 1.83400 | 37.34 |
| 4 | 9.633 | 0.75 | | |
| 5 | 17.523 | 5.50 | 1.69895 | 30.05 |
| 6 | −37.863 | 0.10 | | |
| 7 | 2507.325 | 4.08 | 1.49700 | 81.61 |
| 8 | −7.780 | 2.69 | 1.83400 | 37.34 |
| 9 | −14.857 | 0.10 | | |
| 10 | −62.372 | 1.92 | 1.51580 | 64.20 |
| 11 | −11.830 | 1.00 | | |
| 12 | ∞ | 12.63–2.22 | | |
| 13 | −26.372 | 2.69 | 1.72342 | 37.99 |
| 14 | −16.838 | 2.00 | | |
| 15 | −12.853 | 1.40 | 1.72000 | 50.34 |
| 16 | −18.895 | 4.01 | | |
| 17 | −12.306 | 1.30 | 1.71300 | 53.94 |
| 18 | −52.013 | $f_B$ | | |

The conic constant and aspheric surface coefficients of r13 are as follows;
K; −4.487719737007
$A_4$; 0.2527892605713×10$^{-4}$
$A_6$; 0.1236396823754×10$^{-5}$
$A_8$; −0.6867916729214×10$^{8}$
$A_{10}$; 0.3762102358784×10$^{-10}$ The conic constant and aspheric surface coefficients of r14 are as follows;
K; 0.1253655089792
$A_4$; 0.2544205007459×10$^{-4}$
$A_6$; 0.6553333080179×10$^{-6}$
$A_8$; 0.5329071884745×10$^{-8}$
$A_{10}$; −0.1251617823683×10$^{-9}$ The values of conditions disclosed in relations (1) to (6) are as follows;
Relation (1): $f_1/f_w$; 0.728
Relation (2): $|f_2/f_w|$; 0.757
Relation (3): $m_{2w}$; 1.374
Relation (4): $f_w/f_{wb}$; 4.534
Relation (5): $f_w/D_i$; 9.177
Relation (6): $f_{t/fw}$; 2.78

Figure 9:
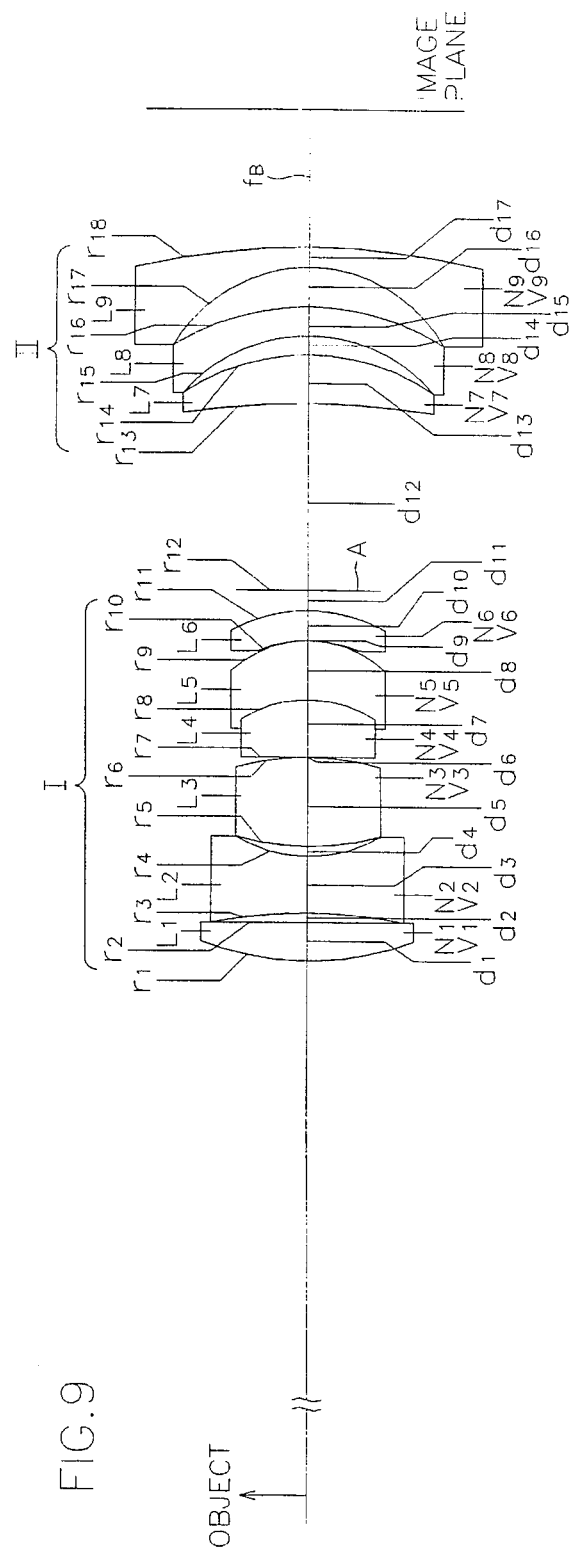
FIG. 9 is a sectional view of a wide-angle zoom lens according to a fifth preferred embodiment of the present invention.

FIG. 9 refers to the zoom lens system according to a fifth preferred embodiment of the present invention. The zoom lens system comprises a first lens group I having a positive refractive power from an object side, a second lens group II having a negative refractive power, and a conventional aperture A.

In the zoom lens system, as embodied herein, preferably the distance between the first and second lens groups I and II is varied during zooming, and the zoom lens system satisfies the conditions of the first preferred embodiment of the present invention. Accordingly, the compensation for the extent of the aberrations having the high performance is made, as shown in FIGS. 10A–10I, and an effect of the operation is identical to that of the first preferred embodiment of the present invention.

A relation between the conditions according to the fifth preferred embodiment of the present invention and various numbers according to the preferred embodiment of number is provided in Table 5.

TABLE 5

$F_{no} = 1{:}3.68{-}10.35$
$f = 29.114{-}81.901$
$\omega = 73.14°{-}29.73°$
$f_B = 7.18{-}59.83$

| Surface Number | r | d | N | v |
|---|---|---|---|---|
| 1 | 19.456 | 2.30 | 1.58267 | 46.46 |
| 2 | 39.996 | 1.37 | | |
| 3 | −42.473 | 1.00 | 1.80420 | 46.54 |
| 4 | 11.406 | 0.69 | | |
| 5 | 16.361 | 3.20 | 1.64769 | 33.84 |
| 6 | 205.242 | 0.10 | | |
| 7 | 31.010 | 5.33 | 1.49700 | 81.61 |
| 8 | −7.543 | 4.50 | 1.83400 | 37.34 |
| 9 | −14.866 | 0.50 | | |
| 10 | 130.650 | 1.92 | 1.51580 | 64.20 |
| 11 | −17.328 | 1.00 | | |
| 12 | ∞ | 11.69–2.05 | | |
| 13 | −47.271 | 2.74 | 1.72000 | 43.90 |
| 14 | −15.107 | 1.52 | | |
| 15 | −14.263 | 1.40 | 1.77250 | 49.62 |
| 16 | −51.821 | 3.59 | | |
| 17 | −13.095 | 1.30 | 1.71300 | 53.94 |
| 18 | −67.460 | $f_B$ | | |

The conic constant and the aspheric surface coefficients of r11 are as follows:
K; 11.64312425238
$A_4$; $0.6303964237200 \times 10^{-5}$
$A_6$; $-0.9841887985265 \times 10^{-7}$
$A_8$; $-0.4131008223596 \times 10^{-8}$
$A_{10}$; $-0.1054856840728 \times 10^{-9}$ The values of conditions disclosed in relations (1) to (6) are as follows;
Relation (1) $f_1/f_2$; 0.717
Relation (2) $|f_2/f_w|$; 0.716
Relation (3) $m_{2w}$; 1.393
Relation (4) $f_w/f_{wb}$; 4.054
Relation (5) $f_w/D_r$; 9.546
Relation (6) $f_t/f_w$; 2.813

Figure 11:
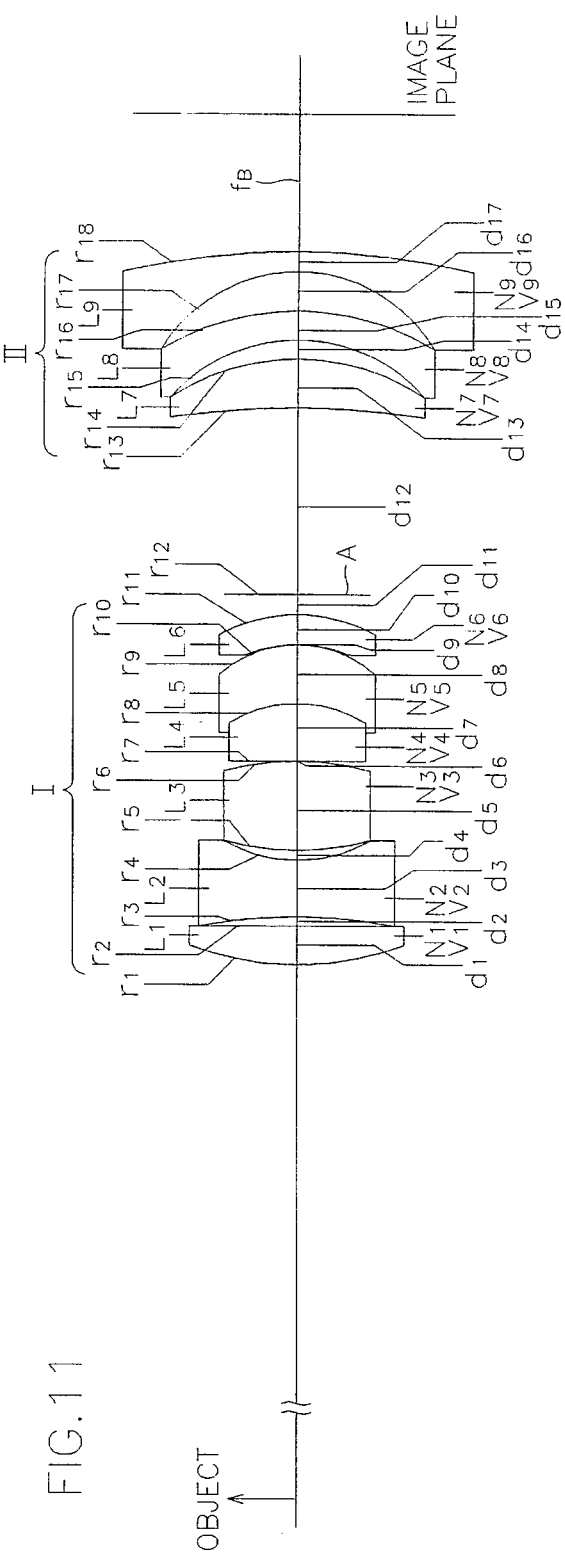
FIG. 11 is a sectional view of a wide-angle zoom lens according to a sixth preferred embodiment of the present invention.
Figures 10A, 10B, 10C:
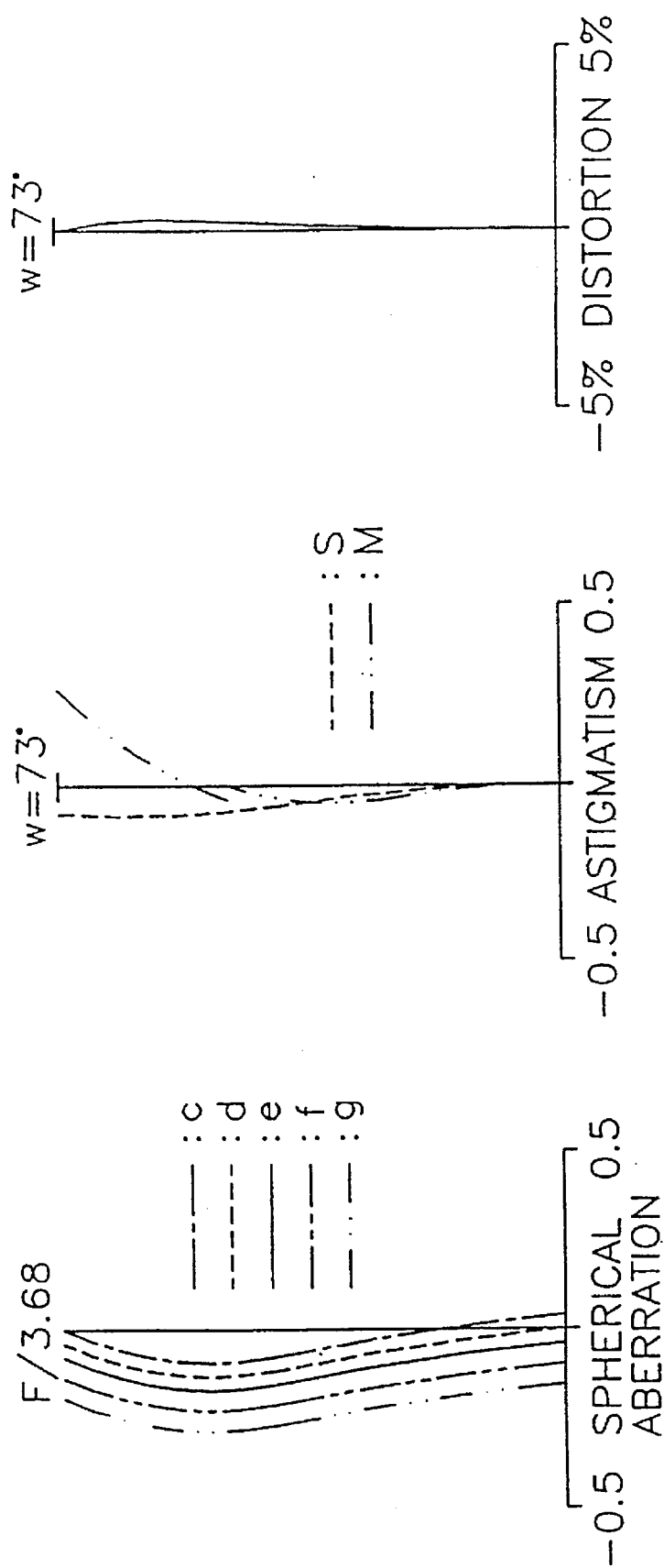
Figures 10G, 10H, 10I:
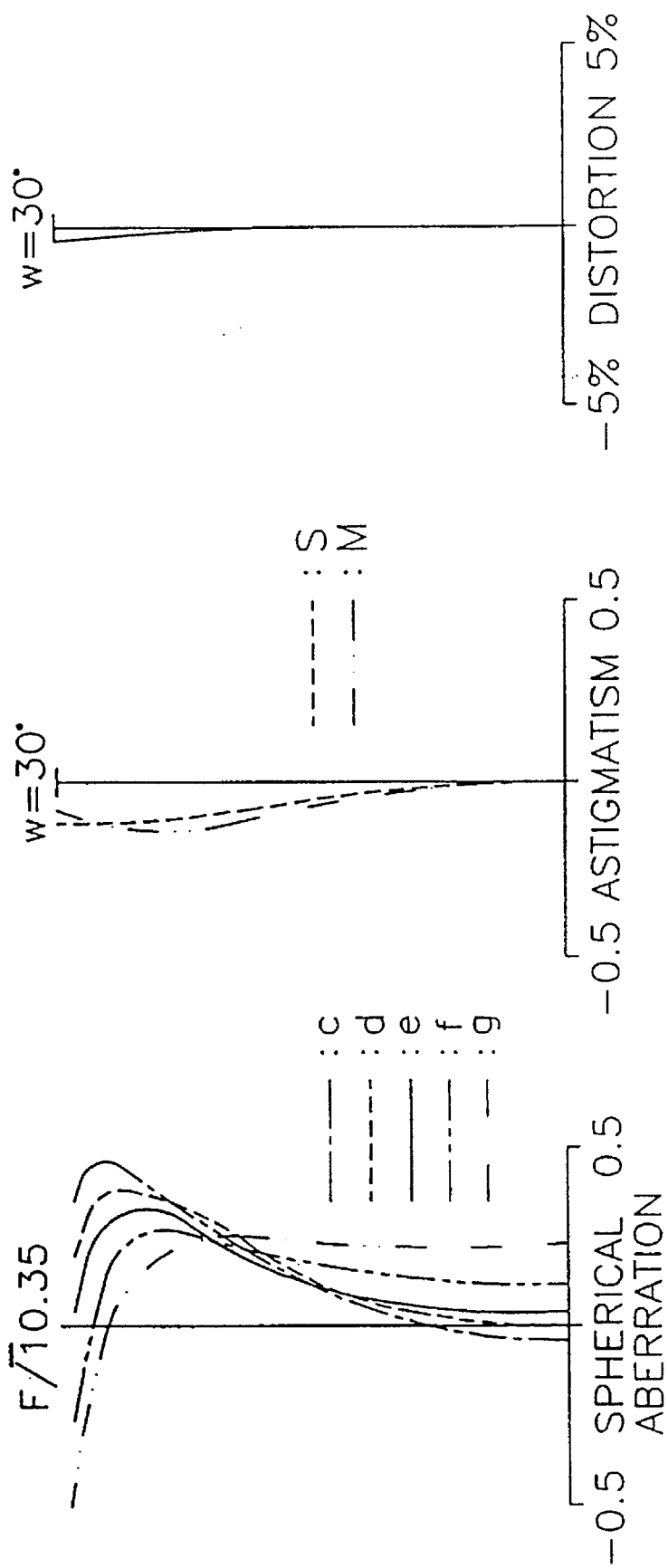
Figures 12A, 12B, 12C:
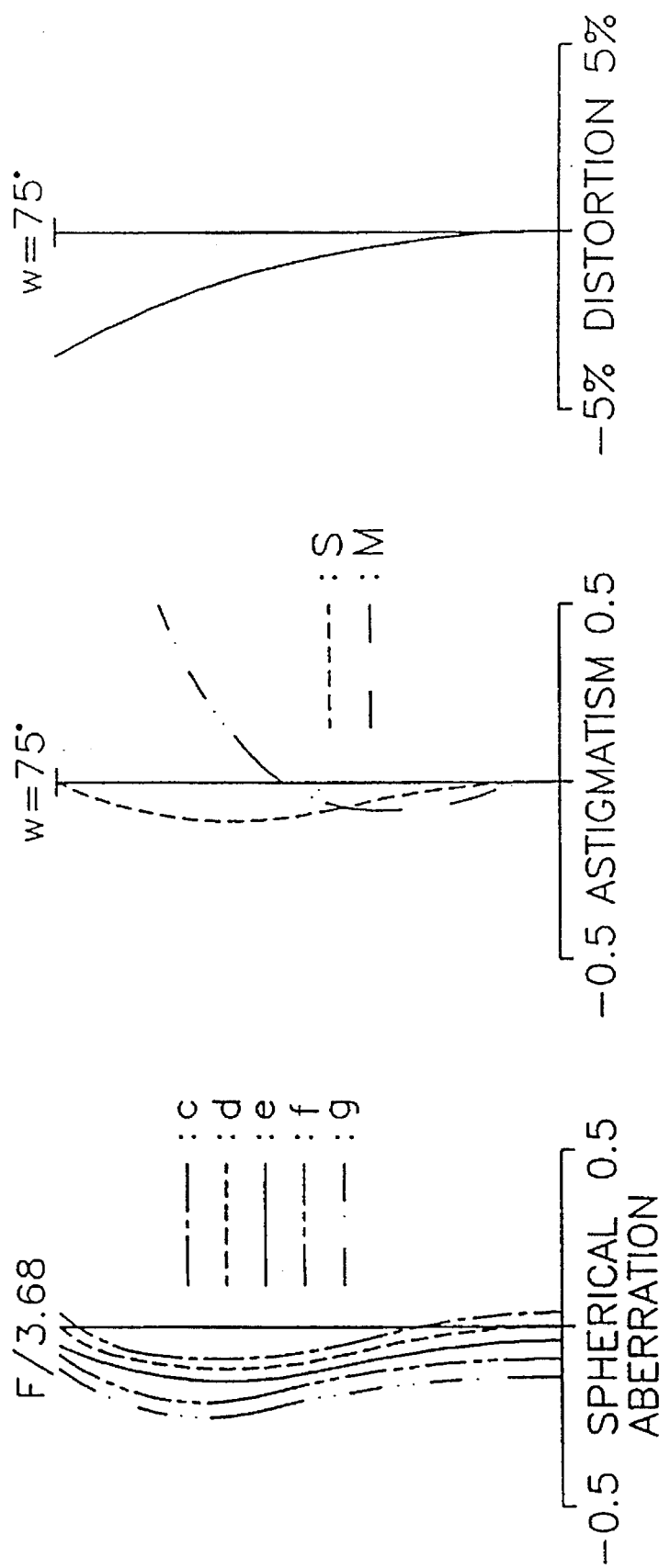

FIG. 11 refers to the zoom lens system according to the sixth preferred embodiment of the present invention. The zoom lens system comprises a first lens group I having a positive refractive power from an object side, a second lens group II having a negative refractive power, and a conventional aperture A.

In the zoom lens system, as embodied herein, preferably the distance between the first and second lens groups I and II is varied during zooming, and the zoom lens system satisfies the conditions of the first preferred embodiment of the present invention. Accordingly, the compensation for the extent of the aberrations having the high performance is made, as shown in FIGS. 12A–12I, and an effect of the operation is identical to that of the first preferred embodiment of the present invention.

A relation between the conditions according to a sixth preferred embodiment of the present invention and various numbers according to the preferred embodiment of number is provided in Table 6.

TABLE 6

$F_{NO} = 1{:}3.68{-}10.39$
$f = 29.028{-}81.987$
$\omega = 75.35°{-}29.74°$
$f_B = 8.50{-}60.02$

| surface number | r | d | N | v |
|---|---|---|---|---|
| 1 | 27.781 | 2.30 | 1.54072 | 47.20 |
| 2 | 101.696 | 0.80 | | |
| 3 | −33.362 | 3.02 | 1.83400 | 37.34 |
| 4 | 11.901 | 0.50 | | |
| 5 | 17.145 | 2.26 | 1.69895 | 30.05 |
| 6 | −1033.497 | 0.59 | | |
| 7 | 24.936 | 5.50 | 1.49700 | 81.61 |
| 8 | −7.115 | 4.50 | 1.83400 | 37.34 |
| 9 | −13.714 | 0.31 | | |
| 10 | 234.812 | 1.92 | 1.51580 | 64.20 |
| 11 | −17.208 | 1.00 | | |
| 12 | ∞ | 10.32–2.50 | | |
| 13 | −48.586 | 2.41 | 1.72342 | 37.99 |
| 14 | −15.201 | 1.54 | | |
| 15 | −14.826 | 1.40 | 1.72000 | 50.34 |
| 16 | −106.407 | 3.13 | | |
| 17 | −11.680 | 1.30 | 1.71300 | 53.94 |
| 18 | −43.233 | $f_B$ | | |

The values of conditions disclosed in relations (1) to (6) are as follows;
Relation (1) $f_1/f_w$; 0.655
Relation (2) $|f_2/f_w|$; 0.637
Relation (3) $m_{2w}$; 1.527
Relation (4) $f_w/f_{wb}$; 3.415
Relation (5) $f_w/D_r$; 8.294
Relation (6) $f_t/f_w$; 2.824

As described the above, the wide-angle and high zoom ratio are embodied in the zoom lens according to the preferred embodiment of the present invention, and the high image formation performance is maintained in the overall zoom range. In addition, the wide-angle zoom lens according to the preferred embodiment of the present invention is made compact, and it is easy to mechanically match the shutter assembly. Also, the wide-angle zoom lens according to the preferred embodiment of the present invention is useful to a camera in which the panoramic photographic system is mounted.

What is claimed is:

1. A wide-angle zoom lens system, comprising:
   a first lens group having a positive refractive power; and
   a second lens group having a negative refractive power and spaced from said first lens group at a first distance, said first distance being variable during zooming,
   wherein said first lens group includes:
   a first lens having a positive refractive power and a convex surface toward an object;
   a second lens having a negative refractive power, the second lens being a bi-concave lens;
   a third lens having a positive refractive power, the third lens being a bi-convex lens;
   a fourth lens having a positive refractive power, the fourth lens being a bi-convex lens;
   a fifth lens having a negative refractive power and a concave surface toward the object; and
   a sixth lens having a positive refractive power and meniscus surfaces;
   wherein said second lens group includes:
   a lens having a positive refractive power and a concave surface toward the object; and
   at least one element of a negative refractive power lens.

2. The wide-angle zoom lens system of claim 1, wherein the zoom lens system has the following characteristics:

$3.4 < f_w/f_{wb} < 5.0;$ and $8.0 < f_w/D_t < 9.6$ where $f_w$: a focal length of the zoom lens system at a wide angle position, $f_{wb}$: a back focus distance of the zoom lens system at the wide angle position, and $D_t$: a distance from the first lens group to the second lens group at a telephoto position.

3. The wide-angle zoom lens system of claim 1, wherein the zoom lens has nine lenses including at least one element of an aspheric lens and wherein the zoom lens system has the following characteristics:

$2.75 < f_t/f_w < 2.85$ where $f_t$: a focal length at a telephoto position, and $f_w$: a focal length at a wide angle position.

4. The wide-angle zoom lens system of claim 2, wherein the zoom lens has nine lenses including at least one element of an aspheric lens and wherein the zoom lens system has the following characteristics:

$2.75 < f_t/f_w < 2.85$ where $f_t$: a focal length at a telephoto position, and $f_w$: a focal length at the wide angle position.

5. The wide-angle zoom lens system of claim 1, wherein the first lens of the first lens group is a meniscus lens.

6. The wide-angle zoom lens system of claim 1, wherein the lens of the second lens group is a meniscus lens.

7. The wide-angle zoom lens system of claim 1, wherein the zoom lens system has the following characteristics:

$0.5 < f_1/f_w < 0.82$ $0.42 < |f_2/f_w| < 0.82, f_2 < 0$ $1.3 < m_{2w} < 1.9$ where $f_1$: a focal length of the first lens group, $f_2$: a focal length of the second lens group, $f_w$: a focal length of the zoom lens system at a wide angle position, and $m_{2w}$: an image formation magnification at a wide angle position.

8. A wide-angle zoom lens system, comprising:

a first lens group having a plurality of lenses and a positive refractive power; and a second lens group having a negative refractive power and spaced from said first lens group at a first distance, said first distance being variable during zooming and the distances between said lenses in the first lens group being constant during zooming, wherein said first lens group includes:

a first lens having a positive refractive power and a convex surface toward an object;

a second lens having a negative refractive power, the second lens being a bi-concave lens;

a third lens having a positive refractive power, the third lens being a bi-convex lens;

a fourth lens having a positive refractive power, the fourth lens being a bi-convex lens;

a fifth lens having a negative refractive power and a concave surface toward the object; and a sixth lens having a positive refractive power and one of convex and meniscus surfaces;

wherein said second lens group includes:

a lens having a positive refractive power and a concave surface toward the object; and at least one element of a negative refractive power lens.

9. The wide-angle zoom lens system of claim 8, wherein the zoom lens system has the following characteristics:

$3.4 < f_w/f_{wb} < 5.0;$ and $8.0 < f_w/D_t < 9.6$ wherein $f_w$: a focal length of the zoom lens system at a wide angle position, $f_{wb}$: a back focus distance of the zoom lens system the wide angle position, and $D_t$: a distance from the first lens group to the second lens group at a telephoto position.

10. The wide-angle zoom lens system of claim 8, wherein the zoom lens has nine lenses including at least one element of an aspheric lens and wherein the zoom lens system has the following characteristics:

$2.75 < f_t/f_w < 2.85$ where $f_t$: a focal length at a telephoto position, and $f_w$: a focal length at a wide angle position.

11. The wide-angle zoom lens system of claim 9, wherein the zoom lens has nine lenses including at least one element of an aspheric lens and wherein the zoom lens system has the following characteristics:

$2.75 < f_t/f_w < 2.85$ where $f_t$: a focal length at a telephoto position, and $f_w$: a focal length at the wide angle position.

12. The wide-angle zoom lens system of claim 8, wherein the first lens of the first lens group is a meniscus lens.

13. The wide-angle zoom lens system of claim 8, wherein the lens of the second lens group is a meniscus lens.

14. The wide-angle zoom lens system of claim 8, wherein the zoom lens system has the following characteristics:

$0.5 < f_1/f_w < 0.82$ $0.42 < |f_2/f_w| < 0.82, f_2 < 0$ $1.3\ 21\ m_{2w} < 1.9$ where $f_1$: a focal length of the first lens group, $f_2$: a focal length of the second lens group, $f_w$: a focal length of the zoom lens system at a wide angle position, and $m_{2w}$: an image formation magnification at a wide angle position.

* * * * *

UNITED STATES PATENT AND TRADEMARK OFFICE
CERTIFICATE OF CORRECTION

PATENT NO. : 5,596,453
DATED : January 21, 1997
INVENTOR(S) : Moon-hyeon KIM

It is certified that error appears in the above-indentified patent and that said Letters Patent is hereby corrected as shown below:

Claim 9, column 14, line 23, after "lens system", insert --at--.

Claim 14, column 14, line 56, "$1.3\ 21\ m_{2w}<1.9$" should read --$1.3<m_{2w}<1.9$--.

Signed and Sealed this

Seventeenth Day of June, 1997

Attest:

BRUCE LEHMAN

*Attesting Officer*        *Commissioner of Patents and Trademarks*